US009969134B2

(12) United States Patent
Kaplan et al.

(10) Patent No.: US 9,969,134 B2
(45) Date of Patent: May 15, 2018

(54) NANOPATTERNED BIOPOLYMER OPTICAL DEVICE AND METHOD OF MANUFACTURING THE SAME

(75) Inventors: David Kaplan, Concord, MA (US); Fiorenzo Omenetto, Wakefield, MA (US); Brian Lawrence, New York, NY (US); Mark Cronin-Golomb, Reading, MA (US)

(73) Assignee: Trustees of Tufts College, Medford, MA (US)

( * ) Notice: Subject to any disclaimer, the term of this patent is extended or adjusted under 35 U.S.C. 154(b) by 1102 days.

(21) Appl. No.: 12/513,394

(22) PCT Filed: Nov. 5, 2007

(86) PCT No.: PCT/US2007/083642
§ 371 (c)(1),
(2), (4) Date: May 4, 2009

(87) PCT Pub. No.: WO2008/127404
PCT Pub. Date: Oct. 23, 2008

(65) Prior Publication Data
US 2010/0120116 A1 May 13, 2010

Related U.S. Application Data

(60) Provisional application No. 60/856,297, filed on Nov. 3, 2006, provisional application No. 60/907,502, filed on Apr. 5, 2007.

(51) Int. Cl.
*B29D 11/00* (2006.01)
*G02B 1/04* (2006.01)

(52) U.S. Cl.
CPC .............. *B29D 11/00* (2013.01); *G02B 1/04* (2013.01); *Y10T 428/24479* (2015.01)

(58) Field of Classification Search
None
See application file for complete search history.

(56) References Cited

U.S. PATENT DOCUMENTS

| 4,676,640 A | 6/1987 | Briggs |
| 4,977,902 A | 12/1990 | Sekino et al. |
| 4,999,295 A | 3/1991 | Asakura et al. |
| 5,244,799 A | 9/1993 | Anderson |
| 5,252,285 A | 10/1993 | Lock |
| 5,427,096 A | 6/1995 | Bogusiewicz et al. |
| 5,474,915 A | 12/1995 | Dordick et al. |
| 5,512,218 A | 4/1996 | Gresser et al. |
| 5,552,270 A | 9/1996 | Khrapko et al. |
| 6,134,045 A | 10/2000 | Jiang et al. |
| 6,150,491 A | 11/2000 | Akkara |
| 6,284,418 B1 | 9/2001 | Trantolo |
| 6,489,446 B1 | 12/2002 | Rothstein et al. |
| 6,753,064 B1 | 6/2004 | Nakama et al. |
| 6,753,131 B1 | 6/2004 | Rogers et al. |
| 6,924,503 B2 | 8/2005 | Cheng et al. |
| 6,989,897 B2 | 1/2006 | Chan et al. |
| 6,992,325 B2 | 1/2006 | Huang |
| 7,223,609 B2 | 5/2007 | Anvar et al. |
| 7,267,958 B2 | 9/2007 | Dordick et al. |
| 7,476,398 B1* | 1/2009 | Doillon et al. ............... 424/423 |
| 7,498,802 B2 | 3/2009 | Takahata |
| 7,674,882 B2 | 3/2010 | Kaplan et al. |
| 7,713,778 B2* | 5/2010 | Li et al. ........................ 438/99 |
| 8,005,526 B2 | 8/2011 | Martin et al. |
| 8,348,974 B2 | 1/2013 | Asakura |
| 8,529,835 B2 | 9/2013 | Kaplan et al. |
| 8,666,471 B2 | 3/2014 | Rogers et al. |
| 8,715,740 B2 | 5/2014 | Wang et al. |
| 8,722,067 B2 | 5/2014 | Wang et al. |
| 9,171,794 B2 | 10/2015 | Rafferty et al. |
| 2001/0002417 A1 | 5/2001 | Akkara et al. |
| 2001/0003043 A1 | 6/2001 | Metspalu et al. |
| 2003/0020915 A1* | 1/2003 | Schueller et al. ............ 356/436 |

(Continued)

FOREIGN PATENT DOCUMENTS

| EP | 0245509 A1 | 11/1987 |
| EP | 1025988 A1 | 8/2000 |

(Continued)

OTHER PUBLICATIONS

Wang et al., Biomaterial Coatings by Stepwise Deposition of Silk Fibroin, Langmuir 2005, 21, 11335-11341.*
Ramajujam, Optical Fabrication of nano-structured biopolymer surfaces, Optical Materials 27 (2005) 1175-1177.*
Extended European Search Report of EP09767706.6, 6 pages (dated Jan. 8, 2013).
Lawrence et al., Bioactive silk protein biomaterial systems for optical devices, Biomacromolecules, Amer. Chem. Society, 9(4):1214-1220 (2008).
Bai, J. et al., Regenerated spider silk as a new biomaterial for MEMS, Biomed Microdevices, 8:317-323 (2006).
Chrisey, D.B. et al., Laser Deposition of Polymer and Biomaterial Films, Chem. Rev 103(2):553-576 (2003).
Fukuoka T. et al., Enzymatic Polymerization of Tyrosine Derivatives. Peroxidase- and Protease-Catalyzed Synthesis of Poly(tyrosine)s with Different Structures, Biomacromolecules 3(4):768-774 (2002).

(Continued)

Primary Examiner — Suzanne M Noakes
Assistant Examiner — Stephen M Chong
(74) Attorney, Agent, or Firm — Choate, Hall & Stewart LLP

(57) ABSTRACT

A method of manufacturing a nanopatterned biopolymer optical device includes providing a biopolymer, processing the biopolymer to yield a biopolymer matrix solution, providing a substrate with a nanopatterned surface, casting the biopolymer matrix solution on the nanopatterned surface of the substrate, and drying the biopolymer matrix solution to form a solidified biopolymer film on the substrate, where the solidified biopolymer film is formed with a surface having a nanopattern thereon. In another embodiment, the method also includes annealing the solidified biopolymer film. A nanopatterned biopolymer optical device includes a solidified biopolymer film with a surface having a nanopattern is also provided.

23 Claims, 16 Drawing Sheets

(56) References Cited

U.S. PATENT DOCUMENTS

| | | |
|---|---|---|
| 2003/0162696 A1 | 8/2003 | Mihara |
| 2003/0203366 A1 | 10/2003 | Lim et al. |
| 2003/0214057 A1 | 11/2003 | Huang |
| 2004/0001299 A1 | 1/2004 | van Haaster et al. |
| 2004/0029241 A1 | 2/2004 | Hahn et al. |
| 2004/0081384 A1 | 4/2004 | Datesman et al. |
| 2004/0229349 A1 | 11/2004 | Daridon |
| 2004/0266992 A1 | 12/2004 | Migliaresi et al. |
| 2005/0008675 A1 | 1/2005 | Bhatia et al. |
| 2005/0151966 A1 | 7/2005 | Packirisamy et al. |
| 2005/0164920 A1 | 7/2005 | Doherty et al. |
| 2005/0169962 A1 | 8/2005 | Bhatia et al. |
| 2005/0194365 A1 | 9/2005 | Li |
| 2005/0208469 A1 | 9/2005 | Daunert et al. |
| 2005/0213868 A1 | 9/2005 | Cunningham |
| 2005/0217990 A1 | 10/2005 | Sibbett et al. |
| 2005/0276791 A1 | 12/2005 | Hansford et al. |
| 2006/0024813 A1 | 2/2006 | Warthoe |
| 2006/0042822 A1 | 3/2006 | Azeyanagi et al. |
| 2006/0091571 A1 | 5/2006 | Akutsu et al. |
| 2006/0111517 A1 | 5/2006 | Feucht et al. |
| 2006/0134606 A1 | 6/2006 | Montagu |
| 2006/0141617 A1 | 6/2006 | Desai et al. |
| 2006/0159837 A1 | 7/2006 | Kaplan et al. |
| 2006/0177479 A1 | 8/2006 | Giachelli et al. |
| 2006/0178655 A1 | 8/2006 | Santini et al. |
| 2006/0205927 A1 | 9/2006 | Jin et al. |
| 2006/0226575 A1 | 10/2006 | Maghribi et al. |
| 2006/0236436 A1* | 10/2006 | Li et al. .......... 977/721 |
| 2007/0007661 A1 | 1/2007 | Burgess et al. |
| 2007/0009968 A1 | 1/2007 | Cunningham et al. |
| 2007/0026064 A1 | 2/2007 | Yoder et al. |
| 2007/0031607 A1 | 2/2007 | Dubson et al. |
| 2007/0042505 A1 | 2/2007 | Israel et al. |
| 2007/0058254 A1 | 3/2007 | Kim |
| 2007/0073130 A1 | 3/2007 | Finch et al. |
| 2007/0113355 A1 | 5/2007 | Knight |
| 2007/0178240 A1 | 8/2007 | Yamazaki et al. |
| 2007/0187862 A1 | 8/2007 | Kaplan et al. |
| 2007/0214520 A1 | 9/2007 | Scheibel et al. |
| 2007/0224677 A1 | 9/2007 | Neumann |
| 2007/0233208 A1 | 10/2007 | Kurtz et al. |
| 2007/0275030 A1 | 11/2007 | Muratoglu et al. |
| 2008/0019925 A1 | 1/2008 | Begleiter |
| 2008/0038236 A1 | 2/2008 | Gimble et al. |
| 2008/0085272 A1 | 4/2008 | Kaplan et al. |
| 2008/0152281 A1 | 6/2008 | Lundquist et al. |
| 2008/0203431 A1 | 8/2008 | Garcia et al. |
| 2008/0239755 A1 | 10/2008 | Parker et al. |
| 2008/0288037 A1 | 11/2008 | Neysmith et al. |
| 2009/0028910 A1 | 1/2009 | DeSimone et al. |
| 2009/0171467 A1 | 7/2009 | Mann et al. |
| 2009/0202614 A1 | 8/2009 | Kaplan et al. |
| 2009/0208555 A1 | 8/2009 | Kuttler et al. |
| 2009/0263430 A1 | 10/2009 | Scheibe et al. |
| 2010/0028451 A1 | 2/2010 | Kaplan et al. |
| 2010/0046902 A1 | 2/2010 | Kaplan et al. |
| 2010/0063404 A1 | 3/2010 | Kaplan et al. |
| 2010/0068740 A1 | 3/2010 | Kaplan et al. |
| 2010/0070068 A1 | 3/2010 | Kaplan et al. |
| 2010/0100975 A1 | 4/2010 | Sutherland et al. |
| 2010/0120116 A1 | 5/2010 | Kaplan et al. |
| 2011/0135697 A1 | 6/2011 | Omenetto et al. |
| 2012/0034291 A1 | 2/2012 | Amsden et al. |
| 2013/0323811 A1 | 12/2013 | Kaplan et al. |
| 2014/0205797 A1 | 7/2014 | Kaplan et al. |
| 2014/0349380 A1 | 11/2014 | Omenetto et al. |
| 2016/0376331 A1 | 12/2016 | Kaplan et al. |

FOREIGN PATENT DOCUMENTS

| | | |
|---|---|---|
| EP | 1116987 A2 | 7/2001 |
| EP | 1166987 A2 | 1/2002 |
| EP | 1209280 A2 | 5/2002 |
| EP | 1467224 A1 | 10/2004 |
| JP | 60142259 A | 7/1985 |
| JP | 60155129 A | 8/1985 |
| JP | 1989135853 | 5/1989 |
| JP | H01-135853 A | 5/1989 |
| JP | 01280242 A | 11/1989 |
| JP | 02 086799 A | 3/1990 |
| JP | 11042106 A | 2/1999 |
| JP | H11-123791 A | 5/1999 |
| JP | 1999123791 | 6/1999 |
| JP | 1999183854 | 7/1999 |
| JP | H11-183854 A | 7/1999 |
| JP | 2000-019119 A | 1/2000 |
| JP | 2000096490 A | 4/2000 |
| JP | 2000143472 A | 5/2000 |
| JP | 2000180969 A | 6/2000 |
| JP | 2001147301 A | 5/2001 |
| JP | 2001280242 A | 10/2001 |
| JP | 2002 287377 A | 10/2002 |
| JP | 2003195001 A | 7/2003 |
| JP | 2003322729 A | 11/2003 |
| JP | 2004162209 A | 6/2004 |
| JP | 2004307661 A | 11/2004 |
| JP | 2005530983 A | 10/2005 |
| JP | 2006119424 A | 5/2006 |
| JP | 2006241450 A | 9/2006 |
| JP | 05-039368 B2 | 10/2012 |
| KR | 20060027113 A | 3/2006 |
| KR | 20070060822 A | 6/2007 |
| KR | 20080069553 A | 7/2008 |
| WO | WO-1993015244 A1 | 8/1993 |
| WO | WO-96/05510 A2 | 2/1996 |
| WO | WO-200031752 A2 | 6/2000 |
| WO | WO-0110464 A1 | 2/2001 |
| WO | WO-200185637 A2 | 11/2001 |
| WO | WO-2003038033 A2 | 5/2003 |
| WO | WO-2004000915 A2 | 12/2003 |
| WO | WO 2004/071949 * | 8/2004 |
| WO | WO-2004092250 A1 | 10/2004 |
| WO | WO 2005/012606 * | 2/2005 |
| WO | WO-2005012606 A2 | 2/2005 |
| WO | 2005/019503 A | 3/2005 |
| WO | WO-2005031724 A1 | 4/2005 |
| WO | WO-2005/103670 A1 | 11/2005 |
| WO | WO-05/123114 A2 | 12/2005 |
| WO | WO-2006020507 A1 | 2/2006 |
| WO | WO-2008/004356 A1 | 1/2008 |
| WO | 2008/118211 A | 10/2008 |
| WO | WO-2008/127402 A2 | 10/2008 |
| WO | WO-2008/127404 A2 | 10/2008 |
| WO | WO-2008127403 A2 | 10/2008 |
| WO | WO-2008127405 A2 | 10/2008 |
| WO | WO-2008/140562 A2 | 11/2008 |
| WO | WO-2009061823 A1 | 5/2009 |
| WO | WO-2010042798 A2 | 4/2010 |
| WO | WO-2010059963 A2 | 5/2010 |
| WO | WO-2010/126640 A2 | 11/2010 |

OTHER PUBLICATIONS

International Search Report of PCT/US2007/083600, dated Nov. 5, 2008, 5 pages.
International Search Report of PCT/US2007/083605, dated Dec. 15, 2008, 6 pages.
International Search Report of PCT/US2007/083620, dated Dec. 5, 2008, 4 pages.
International Search Report of PCT/US2007/083634, dated Nov. 5, 2008, 5 pages.
International Search Report of PCT/US2007/083639, dated Dec. 12, 2008, 5 pages.
International Search Report of PCT/US2007/083642, dated Nov. 5, 2008, 5 pages.
International Search Report of PCT/US2007/083646, dated Dec. 15, 2008, 6 pages.
International Search Report of PCT/US2008/082487, dated Feb. 27, 2009, 3 pages.
International Search Report of PCT/US2009/047751, dated Feb. 2, 2010, 3 pages.

(56) References Cited

OTHER PUBLICATIONS

International Search Report of PCT/US2010/022701, dated Mar. 31, 2010, 2 pages.
International Search Report of PCT/US2010/024004, dated Nov. 26, 2010 5 pages.
International Search Report of PCT/US2010/042585, dated May 25, 2011, 8 pages.
International Search Report of PCT/US2010/047307, dated Apr. 28, 2011, 3 pages.
International Search Report of PCT/US2010/050468, dated Jan. 6, 2011, 3 pages.
International Search Report of PCT/US2011/028094, dated Jul. 14, 2011, 4 pages.
International Search Report of PCT/US2011/032195, dated Oct. 27, 2011, 3 pages.
International Search Report of PCT/US2011/041002, dated Feb. 29, 2012, 4 pages.
IPRP of PCT/US2007/083600, dated May 5, 2009, 6 pages.
IPRP of PCT/US2007/083605, dated May 5, 2009, 10 pages.
IPRP of PCT/US2007/083620, dated May 5, 2009, 6 pages.
IPRP of PCT/US2007/083634, dated May 5, 2009, 6 pages.
IPRP of PCT/US2007/083639, dated May 5, 2009, 6 pages.
IPRP of PCT/US2007/083642, dated May 5, 2009, 6 pages.
IPRP of PCT/US2007/083646, dated May 5, 2009, 10 pages.
IPRP of PCT/US2008/082487, dated May 11, 2010, 10 pages.
IPRP of PCT/US2009/047751, dated Dec. 18, 2010, 5 pages.
IPRP of PCT/US2010/022701, dated Aug. 2, 2011, 5 pages.
IPRP of PCT/US2010/024004, dated Aug. 16, 2011, 6 pages.
IPRP of PCT/US2010/042585, dated Jan. 24, 2012, 6 pages.
IPRP of PCT/US2010/047307, dated Mar. 6, 2012, 5 pages.
Jiang, W. et al, Silicon and Polymer Nanophotonic Devices Based on Photonic Crystals, Proceedings of the International Society of Optical Engineering, 6124(1):612410-1(2006).
Jin, I.J. et al., Water-Stable Silk Films with Reduced Beta-Sheet Content, Adv. Funct. Mater., 15:1241-1247 (2005).
Kouba et al., Fabrication of Nanoimprint Stamps for Photonic Crystals, Journal of Physics: Conference Series, 34(1):897-903 (2006).
Lawrence, B.D. et al., Bioactive silk protein biomaterial systems for optical devices, Biomacromolecules, 9:1214-1220 (2008).
Min, B.M. et al., Regenerated Silk Fibroin Nanofibers: Water Vapor-Induced Structural Changes and Their Effects on the Behavior of Normal Human Cells, Macromol. Biosci., 6(4):285-292 (2006).
Minoura, N. et al., Attachment and Growth of Cultured Fibroblast Cells on Silk Protein Matrices, J. Biomed. Mater. Res. 29(10):1215-1221 (1995).
Notification of Transmittal of International Search Report and the Written Opinion of PCT/US2011/032195, dated Oct. 27, 2011, 2 pages.
Ramanujam, P.S., Optical Fabrication of Nano-Structured Biopolymer Surfaces, Opt. Mater. 27:1175-1177 (2005).
Tu, D. et al., A ZEP520-LOR Bilayer Resist Lift-Off Process by E-Beam Lithography for Nanometer Pattern Transfer, Proceedings of the 7th IEEE Conference on Nanotechnology, 624-627 (2007).

Verma, M.K. et al., Embedded Template-Assisted Fabrication of Complex Microchannels in Pdms and Design of a Microfluidic Adhesive, Langmuir, 22(24)10291-10295 (2006).
Wang, L. et al., Fabrication of Polymer Photonic Crystal Superprism Structures Using Polydimethylsiloxane Soft Molds Journal of Applied Physics, 101(11):114316/1-6 (2007).
Written Opinion of PCT/US2007/083600, dated Nov. 5, 2008, 5 pages.
Written Opinion of PCT/US2007/083605, dated Dec. 15, 2008, 9 pages.
Written Opinion of PCT/US2007/083620, dated Dec. 5, 2008, 5 pages.
Written Opinion of PCT/US2007/083634, dated Nov. 5, 2008, 5 pages.
Written Opinion of PCT/US2007/083639, dated Dec. 12, 2008, 5 pages.
Written Opinion of PCT/US2007/083642, dated Nov. 5, 2008, 5 pages.
Written Opinion of PCT/US2007/083646, dated Dec. 15, 2008, 9 pages.
Written Opinion of PCT/US2008/082487, dated Feb. 27, 2009, 9 pages.
Written Opinion of PCT/US2009/047751, dated Feb. 2, 2010, 4 pages.
Written Opinion of PCT/US2010/022701, dated Mar. 31, 2010, 4 pages.
Written Opinion of PCT/US2010/024004, dated Nov. 23, 2010, 5 pages.
Written Opinion of PCT/US2010/042585, dated May 25, 2011, 5 pages.
Written Opinion of PCT/US2010/047307, dated Apr. 28, 2011, 4 pages.
Written Opinion of PCT/US2011/032195, dated Oct. 27, 2011, 5 pages.
Xu, P. and Kaplan, D.L., Horseradish peroxidase catalyzed polymerization of tyrosine derivatives for nanoscale surface patterning, Journal of Macromolecular Science, Part A: Pure and Applied Chemistry, 41(12):1437-1445 (2004).
Yang, L.J. et al., Fabrication of SU-8 embedded microchannels with circular cross-section, International Journal of Machine Tools & Manufacturing, 44:1109-1114 (2004).
Anderson, J. et al., Bioactive Silk-Like Protein Polymer Films on Silicon Devices, Materials Research Society Synthesis and Thermoelectric Properties, 330:171-177 (1994).
Extended European Search Report for EP 13156510.3, 7 pages (dated Oct. 11, 2013).
Extended European Search Report for EP 13156523.6, 9 pages (dated Dec. 18, 2013).
Partial European Search Report for EP 13156523.6, 6 pages (dated Aug. 28, 2013).
Tamada, Y., New Process to Form a Silk Fibroin Porous 3-D Structure, Biomacromolecules, 6:3100-3106 (2005).
Whitesides, G. M. et al, Soft Lithography in Biology and Biochemistry, Annu. Rev. Biomed. Eng., 3:335-73 (2001).

* cited by examiner

NANOPATTERNED BIOPOLYMER OPTICAL DEVICE AND METHOD OF MANUFACTURING THE SAME

CROSS-REFERENCE TO RELATED APPLICATIONS

This application is a U.S. National Stage entry of International Application No. PCT/US2007/083642, entitled "Nanopatterned Biopolymer Optical Device and Method of Manufacturing the Same", filed on Nov. 5, 2007, which claims the benefit of priority of U.S. Provisional Application Ser. No. 60/856,297 filed on Nov. 3, 2006, entitled "Biopolymer Devices and Methods for Manufacturing the Same." This application also claims the benefit of priority of U.S. Provisional Application Ser. No. 60/907,502, filed on Apr. 5, 2007, entitled "Nanopatterned Biopolymer Optical Device and Method of Manufacturing the Same." Each of these applications are hereby incorporated by reference in their entirety herein.

GOVERNMENT SUPPORT

The invention was made with government support under grant number EB002520 awarded by the National Institutes of Health, DMR0402849 awarded by the National Science Foundation, and FA95500410363 awarded by the Air Force Office of Scientific Research. The government has certain rights in this invention.

BACKGROUND OF THE INVENTION

Field of the Invention

The present invention is directed to nanopatterned biopolymer optical devices, and methods for manufacturing such devices.

Description of Related Art

The field of optics is well established. Some subfields of optics include diffractive optics, micro-optics, photonics and guided wave optics. Various optical devices have been fabricated in these and other subfields of optics for research and commercial application. For example, common optical devices include diffraction gratings, photonic crystals, optofluidic devices, waveguides, and the like.

These optical devices are fabricated using various methods depending on the application and optical characteristics desired. However, these optical devices, and the fabrication methods employed in their manufacture, generally involve significant use of non-biodegradable materials. For example, glass, fused silica, and plastic are commonly used in optical devices. Such materials are not biodegradable and remain in the environment for extended periods of time after the optical devices are removed from service and discarded. Of course, some of the materials can be recycled and reused. However, recycling also requires expenditures of natural resources, and adds to the environmental costs associated with such materials.

Therefore, there exists an unfulfilled need for optical devices that minimize the negative impact to the environment. In addition, there exists an unfulfilled need for optical devices that provide additional functional features that are not provided by conventional optical devices.

SUMMARY OF THE INVENTION

In view of the foregoing, objects of the present invention are to provide various novel biopolymer optical devices and methods for manufacturing such optical devices that may be used in various applications.

One aspect of the present invention is to provide nanopatterned biopolymer optical devices.

Another aspect of the present invention is to provide a method for manufacturing such nanopatterned biopolymer optical devices.

One advantage of the present invention is in providing optical devices that minimize the negative impact to the environment.

Another advantage of the present invention is in providing optical devices that are biocompatible.

Yet another advantage of the present invention is in providing optical devices that have additional functional features that are not provided by conventional optical devices.

In the above regard, inventors of the present invention recognized that biopolymers, and especially silk proteins, present novel structure and resulting functions. For example, from a materials science perspective, silks spun by spiders and silkworms represent the strongest and toughest natural fibers known and present various opportunities for functionalization, processing, and biocompatibility. Over five millennia of history accompany the journey of silk from a sought-after textile to a scientifically attractive fiber. As much as its features had captivated people in the past, silk commands considerable attention in this day and age because of its strength, elasticity, and biochemical properties. The novel material features of silks have recently been extended due to insights into self-assembly and the role of water in assembly. These insights, in turn, have led to new processing methods to generate hydrogels, ultrathin films, thick films, conformal coatings, three-dimensional porous matrices, solid blocks, nanoscale diameter fibers, and large diameter fibers.

Silk-based materials achieve their impressive mechanical properties with natural physical crosslinks of thermodynamically stable protein secondary structures also known as beta sheets ($\beta$-sheets). Thus, no exogenous crosslinking reactions or post-processing crosslinking is required to stabilize the materials. The presence of diverse amino acid side chain chemistries on silk protein chains facilitates coupling chemistry to functionalize silks, such as with cytokines, morphogens, and cell binding domains. There are no known synthetic or biologically-derived polymer systems that offer this range of material properties or biological interfaces, when considering mechanical profiles, aqueous processing, ease of functionalization, diverse modes of processing, self-forming crosslinks, biocompatibility, and biodegradability.

While no other biopolymer or synthetic polymer can match the range of features outlined above for silk, the inventors of the present invention have identified some other polymers that exhibit various properties similar or analogous to silk. In particular, other natural biopolymers including chitosan, collagen, gelatin, agarose, chitin, polyhydroxyalkanoates, pullan, starch (amylose amylopectin), cellulose, hyaluronic acid, and related biopolymers, or a combination thereof, have been identified. In view of the above noted features of biopolymers and of silk in particular, the present invention provides various novel nanopatterned biopolymer optical devices and methods for manufacturing such devices.

In accordance with one aspect of the present invention, one method of manufacturing a nanopatterned biopolymer optical device includes providing a biopolymer, processing the biopolymer to yield a biopolymer matrix solution, providing a substrate with a nanopatterned surface, casting the biopolymer matrix solution on the nanopatterned surface of the substrate, and drying the biopolymer matrix solution to form a solidified biopolymer film on the substrate. The solidified biopolymer film includes a nanopattern on its surface. In another embodiment, the method also includes optionally annealing the solidified biopolymer film and further drying the annealed biopolymer film. In this regard, the optional annealing of the solidified biopolymer film may be performed in a vacuum environment, in a water vapor environment, or in a combination of both environments.

In accordance with various embodiments of the present invention, the substrate and the manufactured biopolymer optical device may be a lens, a microlens array, an optical grating, a pattern generator, or a beam reshaper. In one embodiment, the biopolymer is silk, and the biopolymer matrix solution is an aqueous silk fibroin solution having approximately 1.0 wt % to 30 wt % silk, inclusive, such as an aqueous silk fibroin solution having approximately 8.0 wt % silk. Of course, other embodiments may utilize different percent weight solutions to optimize flexibility or strength of the resultant nanopatterned biopolymer optical device, depending on the application, while maintaining the desired optical functions. In other embodiments, the biopolymer may be chitosan, collagen, gelatin, agarose, chitin, polyhydroxyalkanoates, pullan, starch (amylose amylopectin), cellulose, hyaluronic acid, and related biopolymers, or a combination thereof.

In accordance with another embodiment, the method of manufacturing a nanopatterned biopolymer optical device further includes embedding an organic material in the solidified biopolymer film, and/or adding an organic material into the biopolymer matrix solution. The organic material may be red blood cells, horseradish peroxidase, or phenolsulfonphthalein, or a combination of these organic materials. The organic material may also be a nucleic acid, a dye, a cell, an antibody, enzymes, for example, peroxidase, lipase, amylose, organophosphate dehydrogenase, ligases, restriction endonucleases, ribonucleases, DNA polymerases, glucose oxidase, laccase, cells, viruses, proteins, peptides, small molecules, drugs, dyes, amino acids, vitamins, antioxidants, DNA, RNA, RNAi, lipids, nucleotides, aptamers, carbohydrates, chromophores, light emitting organic compounds such as luciferin, carotenes and light emitting inorganic compounds, chemical dyes, antibiotics, antifungals, antivirals, light harvesting compounds such as chlorophyll, bacteriorhodopsin, protorhodopsin, and porphyrins and related electronically active compounds, or a combination thereof.

Other materials may be embedded in the biopolymer or in the biopolymer matrix solution instead of, or in addition to, organic materials, depending upon the type of optical device desired.

In accordance with another aspect of the present invention, a nanopatterned biopolymer optical device is provided that includes a solidified biopolymer film with a surface having a nanopattern thereon. In various embodiments, the biopolymer optical device may be an optical grating, a lens, a microlens array, a pattern generator, or a beam reshaper.

These and other advantages and features of the present invention will become more apparent from the following detailed description of the preferred embodiments of the present invention when viewed in conjunction with the accompanying drawings.

DETAILED DESCRIPTION OF THE INVENTION

As described in detail below, the nanopatterned biopolymer optical devices in accordance with the present invention have been fabricated using a biopolymer such as silk. In this regard, the silk utilized was silkworm silk. However, there are many different silks, including spider silk, transgenic silks, and genetically engineered silks, variants and combinations thereof and others, that may alternatively be used in accordance with the present invention to obtain a nanopatterned biopolymer optical device.

In addition, other biodegradable polymers may be used instead of silk. For example, additional biopolymers, such as chitosan, exhibit desirable mechanical properties, can be processed in water, and form generally clear films for optical applications. Other biopolymers, such as chitosan, collagen, gelatin, agarose, chitin, polyhydroxyalkanoates, pullan, starch (amylose amylopectin), cellulose, hyaluronic acid, and related biopolymers, or a combination thereof, may alternatively be utilized in specific applications, and synthetic biodegradable polymers such as polylactic acid, polyglycolic acid, polyhydroxyalkanoates and related copolymers may also be selectively used. Some of these polymers are not as easily processable in water. Nonetheless, such polymers may be used by themselves, or in combinations with silks, and may be used in particular biopolymer optical devices.

The term "nanopatterned" as used with regard to the present invention refers to very small patterning that is provided on a surface of the biopolymer optical device. The patterning has structural features whose size can be appropriately measured on a nanometer scale (that is, $10^{-9}$ meters), for example, sizes ranging from 100 nm to few microns. Additionally, the biopolymer optical devices of the present invention may incorporate various different optical devices such as lenses, diffraction gratings, photonic crystals, waveguides, and the like.

Figure 1:
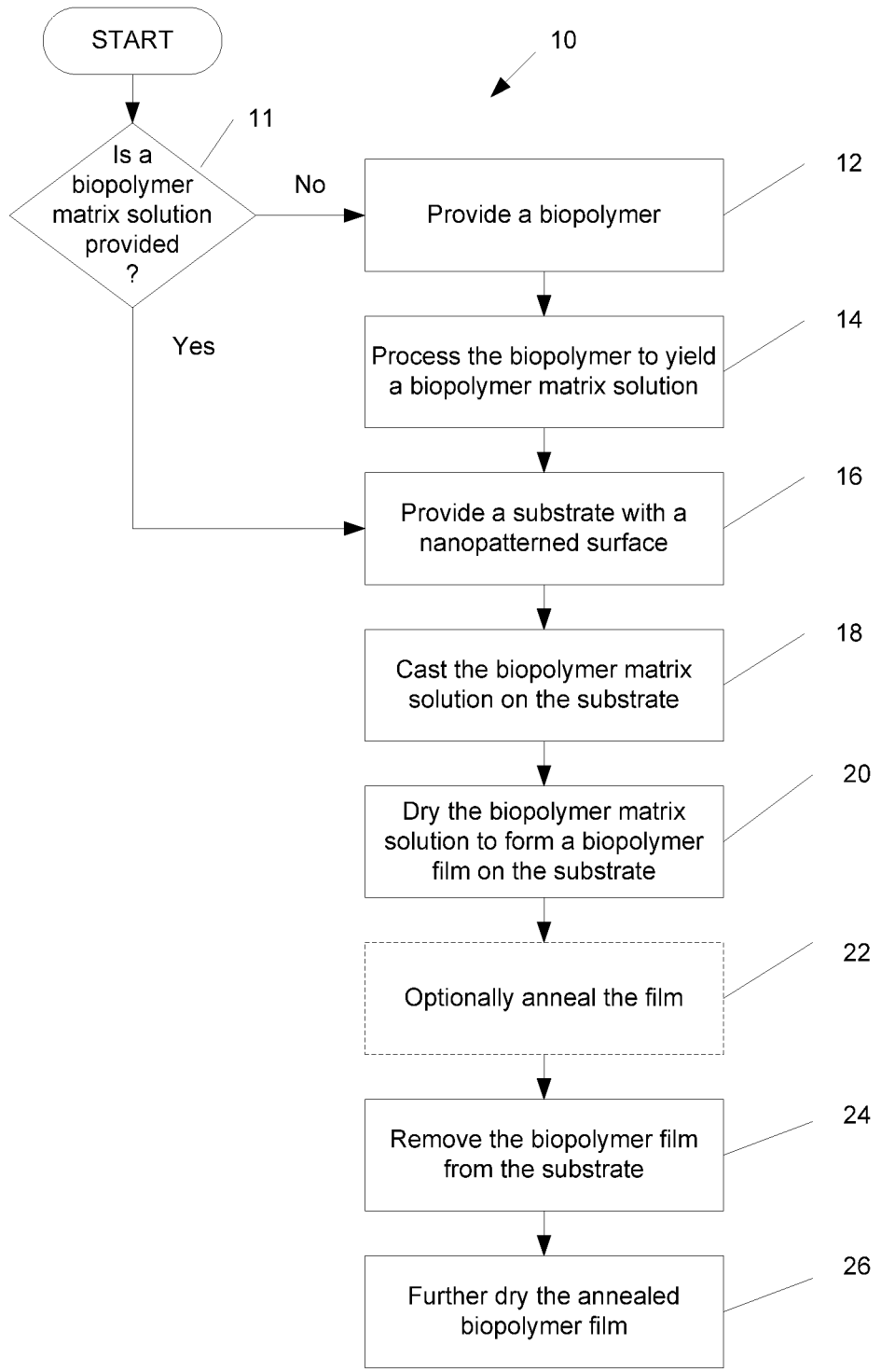
FIG. 1 is a schematic flow diagram illustrating a method in accordance with one embodiment of the present invention.

FIG. 1 is a schematic illustration of a flow diagram 10 showing a method of manufacturing a nanopatterned biopolymer optical device in accordance with one embodiment of the present invention. If a biopolymer matrix solution is provided in step 11, the process proceeds to step 16 described below. Otherwise, a biopolymer is provided in step 12. In the example where the biopolymer is silk, the biopolymer may be attained by extracting sericin from the cocoons of Bombyx mori. The provided biopolymer is processed to yield a biopolymer matrix solution in step 14. In one embodiment, the biopolymer matrix solution is an aqueous matrix solution. However, in other embodiments, different solvents other than water, or a combination of water and other solvents may be used, depending on the biopolymer used.

Thus, in the example of silk, an aqueous silk fibroin solution is processed in step 14, for example, 8.0 wt %, which is then used to manufacture the nanopatterned biopolymer optical device. Of course, in other embodiments, the solution concentrations may also be varied from very dilute (approximately 1 wt %) to very high (up to 30 wt %) using either dilution or concentration, for example, via osmotic stress or drying techniques. In this regard, other embodiments may utilize different percent weight solutions to optimize flexibility or strength of the resultant nanopatterned biopolymer optical device, depending on the application. Production of aqueous silk fibroin solution is described in detail in WIPO Publication Number WO 2005/012606 entitled "Concentrated Aqueous Silk Fibroin Solution and Uses Thereof".

A substrate is provided in step 16 to serve as a mold in manufacturing the biopolymer optical device. A surface of the substrate has the desired characteristic features to be formed on the biopolymer optical device. In this regard, the substrate may be an appropriate nanopattern on a surface of the optical device and may be an optical device such as a nanopatterned optical grating, depending on the optical features desired for the biopolymer optical device being manufactured. The aqueous biopolymer matrix solution is then cast on the substrate in step 18. The aqueous biopolymer matrix solution is then dried in step 20 to transition the aqueous biopolymer matrix solution to the solid phase. In this regard, the aqueous biopolymer matrix solution may be dried for a period of time such as 24 hours, and may optionally be subjected to low heat to expedite drying of the aqueous biopolymer matrix solution. Upon drying, a solidified biopolymer film is formed on the surface of the substrate. The thickness of the biopolymer film depends on the volume of the biopolymer matrix solution applied to the substrate.

Once the solvent of the biopolymer matrix solution has evaporated, the solidified biopolymer film may be optionally annealed in step 22. This annealing step is preferably performed within a water vapor environment, such as in a chamber filled with water vapor, for different periods of time depending on the material properties desired. Typical annealing time periods may range from between two hours to two days, for example, and may also be performed in a vacuum environment. The annealed biopolymer film is then removed from the substrate in step 24 and allowed to dry further in step 26, thereby resulting in a biopolymer optical device. The annealed films manufactured in the above-described manner have a functional optical surface that matches the surface provided on the substrate. The annealed film can then be used as a nanopatterned biopolymer optical device in accordance with the present invention.

Figure 2:
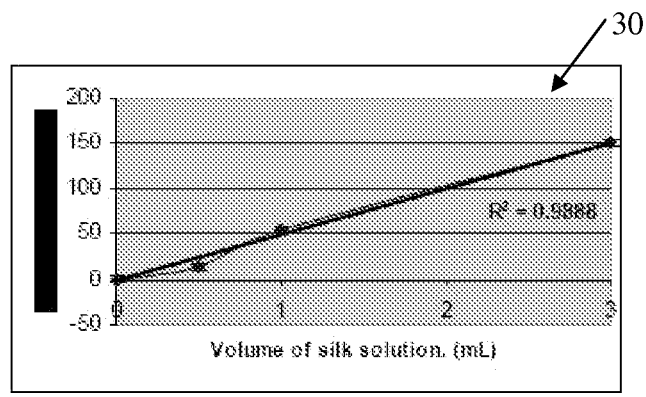
FIG. 2 is a graph that illustrates the relationship between the volume of 8% silk concentration vs. film thickness.

Experiments were conducted to validate the above-described method by manufacturing various biopolymer optical devices. The relationship between the volume of 8 wt % silk concentration aqueous silk fibroin solution, and the resulting silk film thickness, is shown in the graph 30 of FIG. 2, where the aqueous silk fibroin solution was cast over a substrate surface of approximately 10 square centimeters. The X-axis shows the volume of silk fibroin solution in mL, and the Y-axis shows the thickness of the resultant film in μm.

Of course, the film properties such as thickness and biopolymer content, as well as optical features, may be altered based on the concentration of fibroin used in the process, the volume of the aqueous silk fibroin solution deposited, and the post deposition process for drying the cast solution to lock in the structure. Accurate control of these parameters is desirable to ensure the optical quality of the resultant biopolymer optical device and to maintain various characteristics of the biopolymer optical device, such as transparency, structural rigidity, and flexibility. Furthermore, additives to the biopolymer matrix solution may be used to alter features of the biopolymer optical device such as morphology, stability, and the like, as known with polyethylene glycols, collagens, and the like.

Figure 3A:
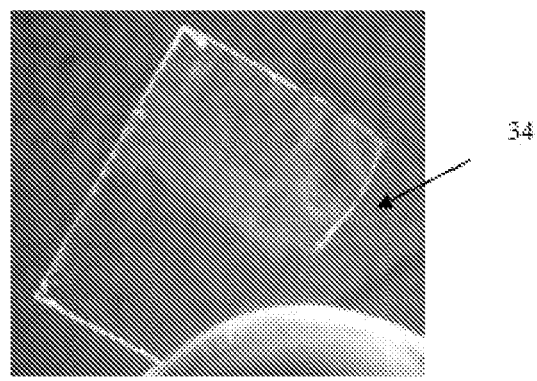
FIG. 3A is a photograph of an unpatterned silk film.
Figure 3B:
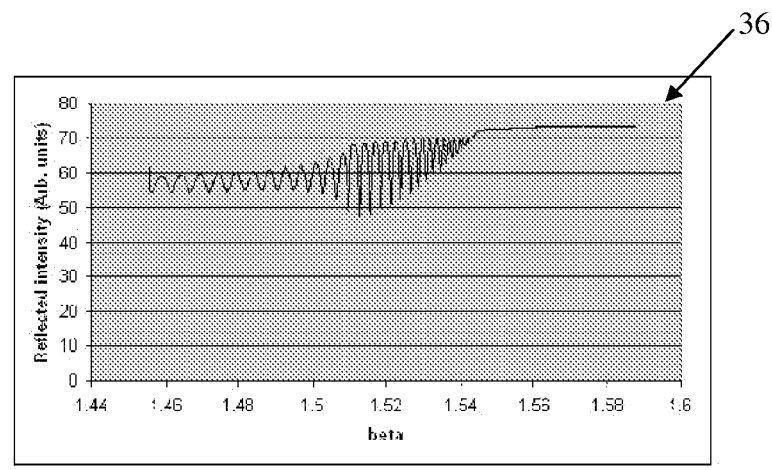
FIG. 3B is a graph showing the prism coupled angular dependence of reflectivity of the unpatterned silk film of FIG. 3A.

An unpatterned biopolymer film having a thickness of 10 μm was manufactured in the above-described manner using an aqueous silk fibroin solution, and was characterized in a scanning prism coupled reflectometer from Metricon Corporation. FIG. 3A illustrates the unpatterned biopolymer film 34 manufactured and characterized. The index of refraction of the biopolymer film 34 was measured to be n=1.55 at 633 nm, which is slightly higher than the index of refraction of conventional borosilicate glass. The measured index of refraction confirms that the value is high enough to afford reasonable contrast for optical use such as in air-silk biophotonic crystals (BPC) ($\Delta n_{fibroin} - \Delta n_{air} = 0.55$). The characterization of the unpatterned silk film 34 is shown in graph 36 of FIG. 3B, which clearly demonstrates the prism coupled angular dependence of the reflectivity. The oscillations in graph 36 are due to coupling into guided waves, demonstrating the use of silk as a waveguide material.

Figure 3C:
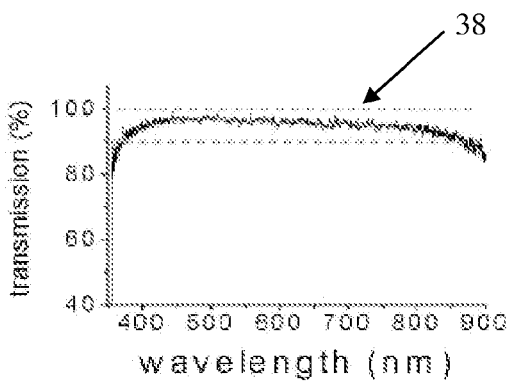
FIG. 3C is a graph showing the measured transmission of light through the silk film of FIG. 3A.

In addition, the unpatterned silk film 34 was also analyzed to determine transparency. FIG. 3C is a graph 38 that illustrates the measured transmission of light through the silk film 34 in various wavelengths. Transmission measurements indicate that the unpatterned silk film 34 was highly transparent across the visible spectrum. For comparison, similar thickness films were also cast in collagen, and polydimethylsiloxane (PDMS). The free-standing structural stability was found to be inferior, and the resultant biopolymer optical device was not self-supporting when implemented as a thin film. However, such biopolymers may be used in an application if structural stability is deemed to be not as important.

Importantly, shaped films having various thicknesses were patterned on the nanoscale using the method of FIG. 1 described above to provide nanopatterned biopolymer optical devices. A variety of nanopatterned biopolymer optical devices were successfully manufactured using the above-described method of the present invention using silk fibroin solution. These devices included lenses, microlens arrays, optical gratings, pattern generators and beam reshapers. In particular, the aqueous solution of silk fibroin was cast onto specific substrates with patterns thereon. The substrate surfaces were coated with Teflon™ to ensure even detachment after the biopolymer matrix solution transitions from the liquid to the solid phase. The ability of the biopolymer casting method of the present invention for forming highly defined nanopatterned structures in biopolymer optical devices was verified by casting diffraction gratings and lenses. Regular patterned features with dimensions down to 210 nm, and localized surface roughness of less than 20 nm, have been attained.

Such regular patterning of biocompatible materials allows manufacturing of optical devices that can be used to provide photonic bandgaps and manipulate light via an organic, yet mechanically robust optical device. These devices combine the flexibility of embedded optics with the unique versatility of the protein substrate as explained in further detail below. Many advantages are provided by the present invention including combining the organic nature of biopolymers such as silk with the power of diffractive and transmissive optics embedded in an organic matrix to create biologically active optical elements. Silk provides a controllably degradable, biocompatible, and structurally strong medium with which to fabricate the optical devices in accordance with the present invention.

Figure 4A:
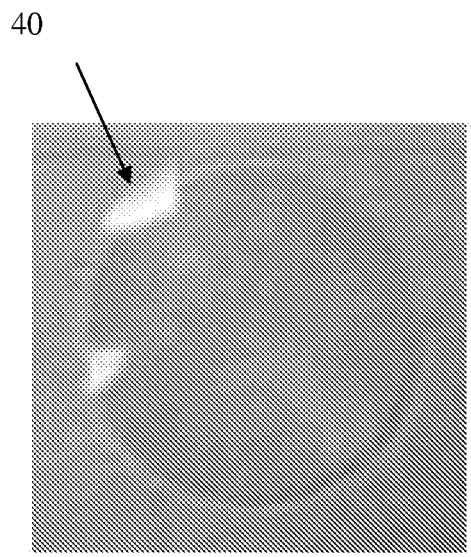
FIG. 4A is a photograph of a nanopatterned biopolymer focusing lens in accordance with one embodiment of the present invention.
Figure 4B:
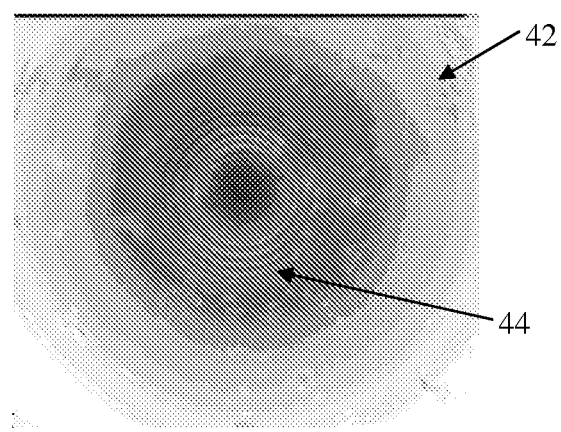
FIG. 4B is a microscope image of the nanopatterned biopolymer focusing lens of FIG. 4A.

FIG. 4A is a photograph showing a nanopatterned biopolymer focusing lens 40 that was manufactured using the method described above with an aqueous silk fibroin solution. The biopolymer focusing lens 40 has a diameter of less than 1 centimeter and has nanopatterned concentric rings formed on its surface. FIG. 4B is a microscopic image 42 of the biopolymer focusing lens 40 shown in FIG. 4A. The microscopic image 42 clearly shows the nanopatterned concentric rings 44 on the biopolymer focusing lens.

Figure 5:
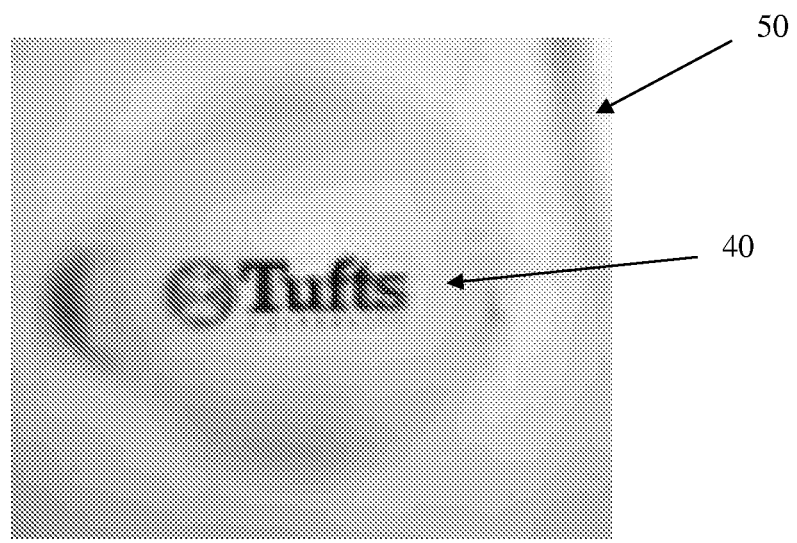
FIG. 5 is a photograph of image of lettering viewed through the nanopatterned biopolymer focusing lens of FIG. 4A.

FIG. 5 shows a photograph image 50 of lettering "Tufts" as seen through the nanopatterned focusing lens 40 of FIG. 4A. This photograph clearly illustrates the optical applicability of optical devices made of biopolymers that are manufactured in accordance with the method of the present invention.

Figure 6A:
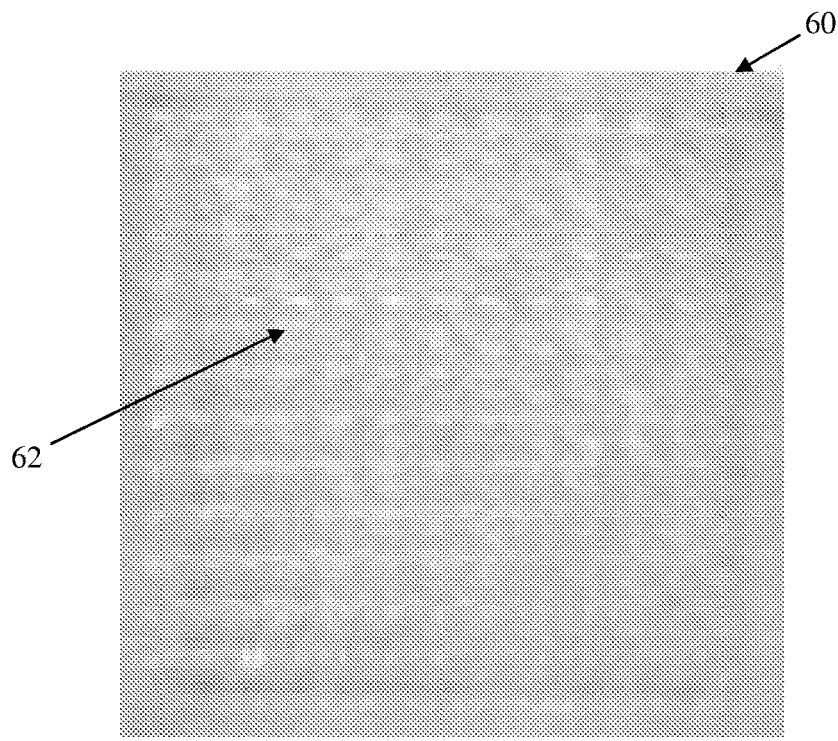
FIG. 6A is a photograph of a nanopatterned biopolymer lens array in accordance with another embodiment of the present invention.
Figure 6B:
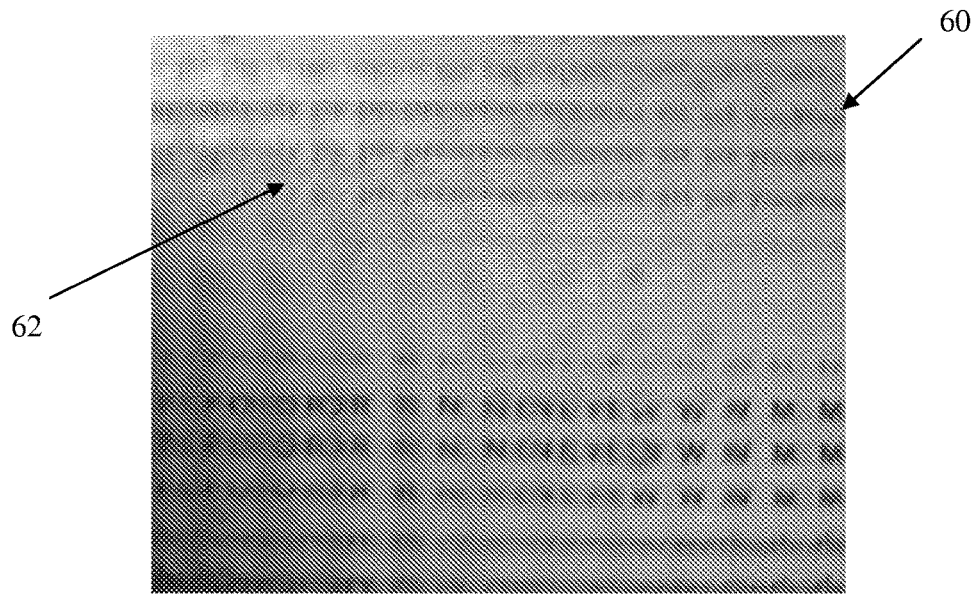
FIG. 6B is a photograph of lettering as viewed through the nanopatterned biopolymer lens array of FIG. 6A.

In addition, nanopatterned biopolymer optical devices were manufactured by casting the aqueous silk fibroin solutions on microlens arrays and on other pattern generators. In particular, the aqueous silk fibroin solution was cast on various patterned surfaces of optical elements, left to solidify, and subsequently annealed in accordance with the method described above with regard to FIG. 1. FIGS. 6A and 6B are photographs of a lens array 60 manufactured in accordance with the present invention using aqueous silk fibroin solution. The lens array 60 was cast on a polycarbonate film from Digital Optics Corporation. The obtained silk lens array 60 is approximately 1 cm² in size and is patterned with 12×12 lenses 62 thereon. The lenses 62 provided on the lens array 60 demonstrate that accurately patterned biopolymer optical devices can be manufactured by casting a biopolymer matrix solution, such as an aqueous silk fibroin solution, on a substrate that functions as a mold. FIG. 6B is a photograph of text as seen through the silk lens array 60.

Figure 7A:
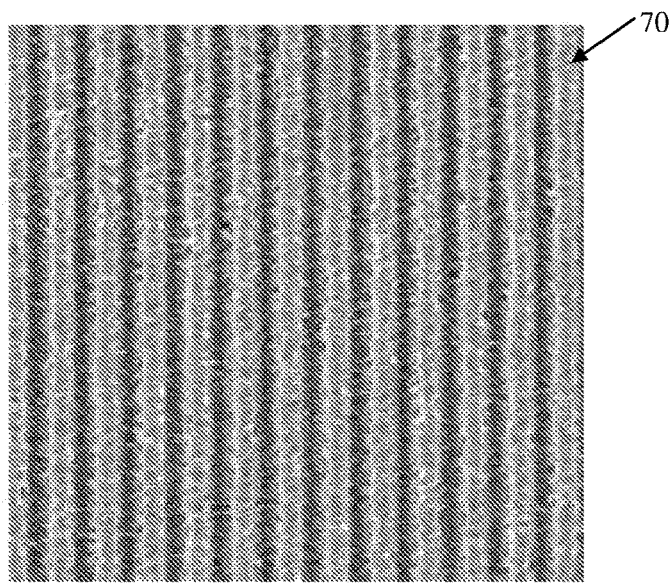
FIG. 7A is a scanning electron microscope image of a portion of a nanopatterned biopolymer diffraction grating in accordance with another embodiment of the present invention.
Figure 7B:
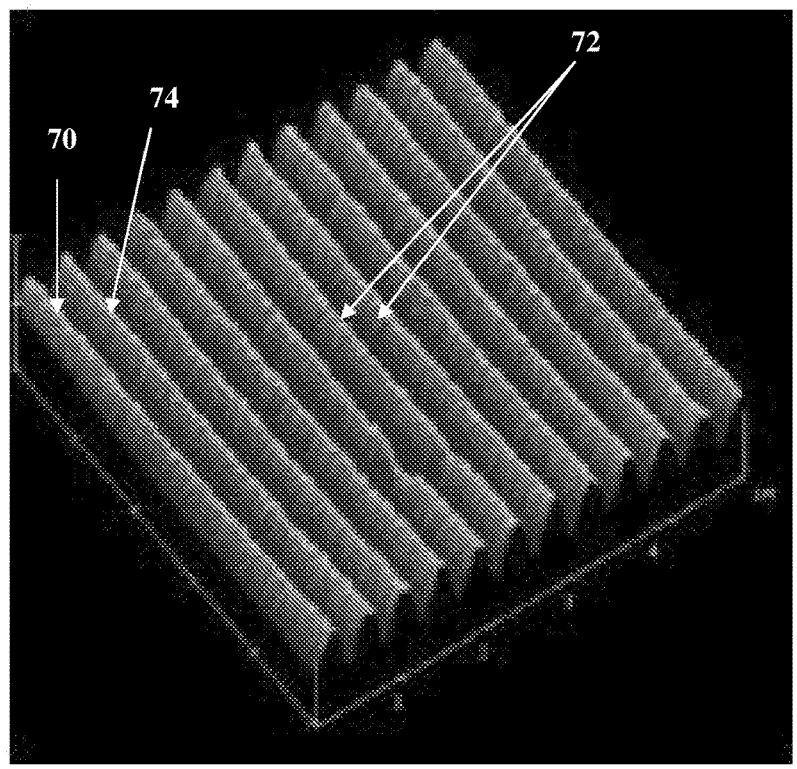
FIG. 7B is an atomic force microscope image of another portion of the nanopatterned biopolymer diffraction grating of FIG. 7A.
Figure 7C:
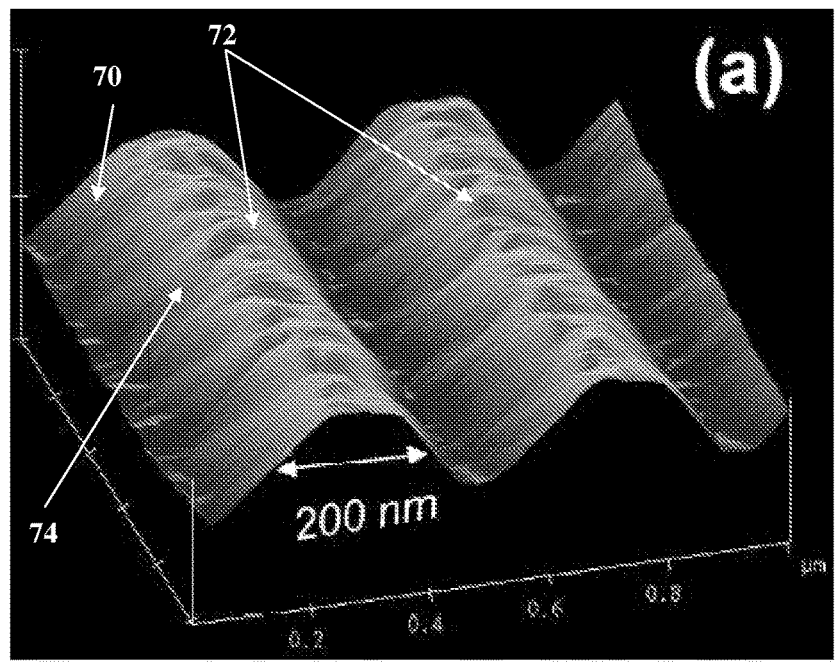
FIG. 7C is a high-resolution atomic force microscope image of another portion of the nanopatterned biopolymer diffraction grating of FIG. 7A.

In addition, holographic diffraction gratings of various line pitches were also used as substrates upon which an aqueous silk fibroin solution was cast for manufacturing nanopatterned biopolymer diffraction gratings in accordance with the present invention. In this regard, FIG. 7A is a scanning electron microscope image of a portion of a nanopatterned biopolymer diffraction grating 70 that was manufactured in accordance with the method of FIG. 1 by casting an aqueous silk fibroin solution on a holographic diffraction grating with 2,400 lines/mm. The resultant biopolymer diffraction grating 70 of silk also has gratings 72 at 2,400 lines/mm. FIGS. 7B and 7C are atomic force microscope (AFM), and high-resolution AFM images, respectively, of a portion of the surface of the nanopatterned biopolymer diffraction grating 70. The portion of the diffraction grating 70 shown in FIG. 7C is approximately 1 µm$^2$. As shown, the ridges of the grating were approximately 200 nm wide and spaced by approximately 200 nm at full width at half maximum (FWHM). The peak to valley height difference of 150 nm was observed.

As can be seen from the AFM images of FIGS. 7B and 7C, nanopatterned biopolymer diffraction grating 70 had highly regular, structured gratings 72 on the nanoscale with remarkably smooth sidewalls 74. A topographical evaluation of the surface roughness at the peaks of the gratings 72 and valleys between the gratings 72 revealed surface roughness root mean square (RMS) values below 20 nm while being structurally stable. These values characterize outstanding resolution from optics and materials perspectives.

The measured roughness of cast silk film on an optically flat surface shows measured root mean squared roughness values between 2.5 and 5 nanometers, which implies a surface roughness easily less than λ/50 at a wavelength of 633 nm. Atomic force microscope images of patterned silk diffractive optics show the levels of microfabrication obtainable by casting and lifting silk films off of appropriate molds. The images show definition in the hundreds of nanometer range and the sharpness of the corners indicates the possibility of faithful patterning down to the tens of nanometers.

Figure 8:
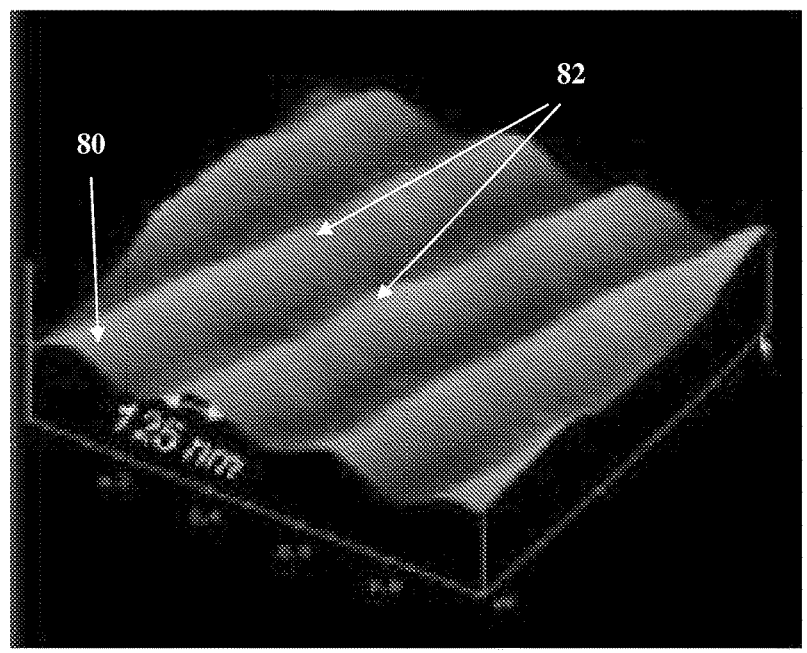
FIG. 8 is a high-resolution atomic force microscope image of a portion of another nanopatterned biopolymer diffraction grating in accordance with another embodiment of the present invention.

FIG. 8 is a high-resolution atomic force microscope (AFM) image of a 1 µm$^2$ portion of a nanopatterned silk diffraction grating 80 that was also manufactured in accordance with the method of the present invention by casting aqueous silk fibroin solution on an optical diffraction grating having a pitch of 3,600 lines/mm. The resultant biopolymer diffraction grating 80 also has 3,600 lines/mm. The structured gratings 82 were measured to be 125 nm apart at FWHM with a peak to valley height difference of 60 nm. As can be seen, highly regular structured gratings 82 on the nanoscale were obtained with remarkably smooth sidewalls. Topographic analysis of the surfaces again revealed a surface roughness of less than 20 nanometers RMS.

Other example diffraction gratings of different line pitches, and different sizes as large as 50×50 mm, were also manufactured using the method of the present invention. In this regard, diffraction gratings having 600 lines/mm and 1,200 lines/mm were also used to manufacture nanopatterned biopolymer diffraction gratings. The resultant nanopatterned biopolymer diffraction gratings were found to reproduce the fine features with a surface smoothness having RMS less than 20 nm while being structurally stable. In certain areas, the smoothness was found to have RMS roughness of less than 10 nm.

Figure 9A:
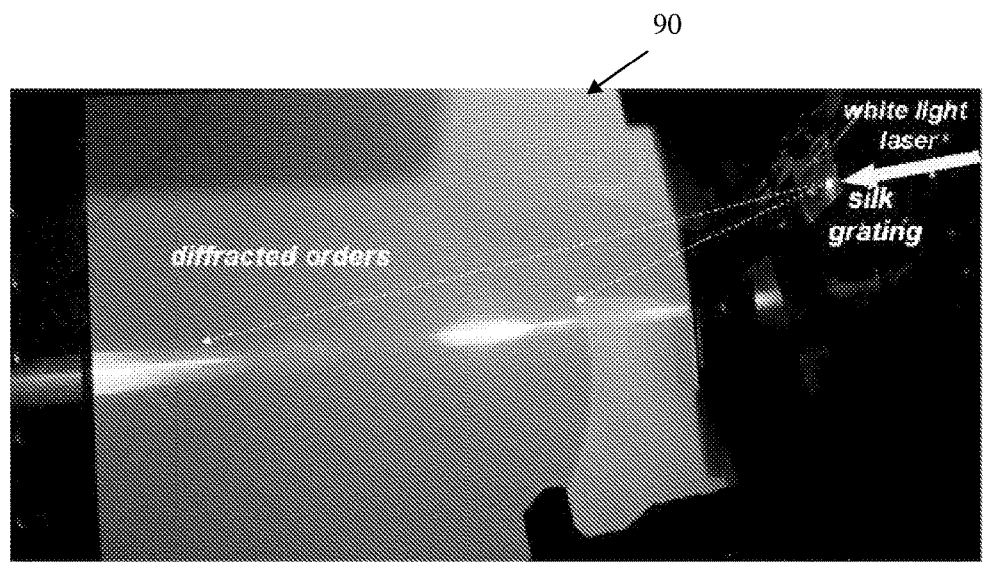
FIG. 9A is a photograph showing the diffracted orders from a supercontinuum laser source impinging on a nanopatterned biopolymer diffraction grating in accordance with the present invention.

Samples of patterned biopolymer diffraction gratings were optically analyzed by transmitting both single wavelength and white (supercontinuum) coherent light through the silk diffraction gratings to examine the diffraction properties. FIG. 9A is a photograph 90 that illustrates diffracted orders from a white light laser source impinging on a silk diffraction grating manufactured in accordance with the present invention. As can be seen, central order and three diffraction orders were observed. The measured diffraction efficiency in the m=1 and m=−1 orders was approximately 37% in the illustrated experiment. Radiation with an average power approaching 1 W was transmitted through the silk diffraction grating successfully without damaging the diffraction grating structure.

Figure 9B:
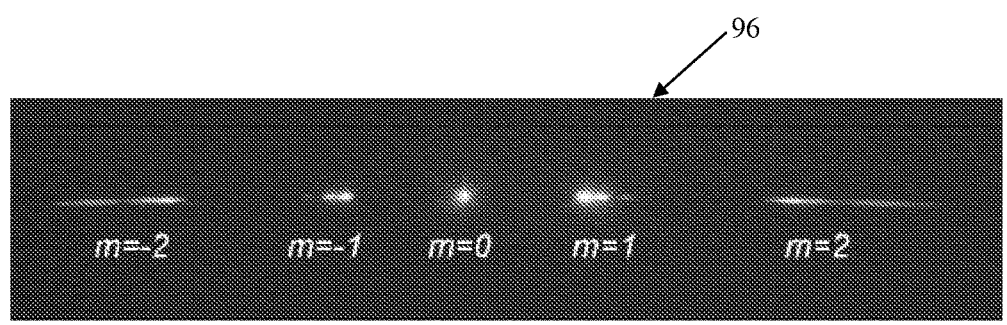
FIG. 9B is a photograph showing the diffracted orders from a supercontinuum laser source impinging on another nanopatterned biopolymer diffraction grating in accordance with the present invention.

FIG. 9B is another photograph 96 that illustrates diffracted orders from a supercontinuum laser source impinging on a silk diffraction grating with 1,200 lines/mm that was made in accordance with the present invention. The diffracted orders were imaged 2 cm from the silk diffraction grating. The diffraction efficiency of this grating was found to be 34% in the first order at 633 nm, which compares favorably to conventional transmissive glass gratings.

The structural stability and the ability to faithfully reproduce nanostructures makes the above-described method an excellent process for manufacturing many different diffractive optical structures or refractive micro and nano-optical structures. Among the various optical devices that can be readily manufactured are optical gratings, micro and nano lens arrays as described above, pattern generators, beam diffusers, beam homogenizers or layered diffractive optics, such as photonic crystals or waveguides.

Transmissive nanopatterned diffractive biopolymer optical devices were made using the method of the present invention described above. These optical devices include silk diffusers, line pattern generators, and cross pattern generators. Such optical devices use appropriately configured wavelength scale surface structuring to create predefined one or two-dimensional light patterns that exploit light interference. Such optical devices made of conventional materials have been applied to imaging, spectroscopy, beam sampling and transformation, and metrology to name a few uses. Extending this approach to control the delivery of light within a biological matrix such as silk biopolymer can provide optimal coupling of photons into a substrate or allow for designed optical discrimination, interface, or readout.

Figure 10A:
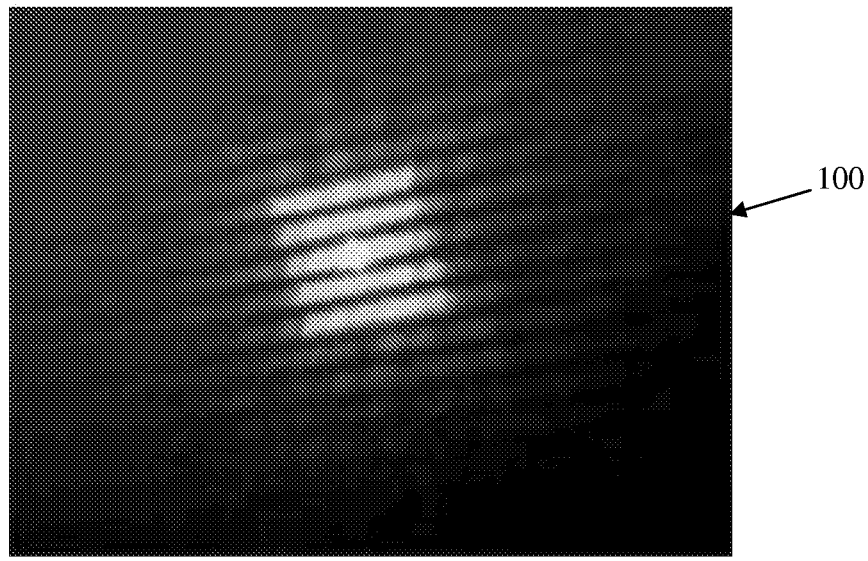
FIG. 10A is a photograph showing a broad white light laser transmitted through another nanopatterned biopolymer diffractive grating in accordance with the present invention.
Figure 10B:
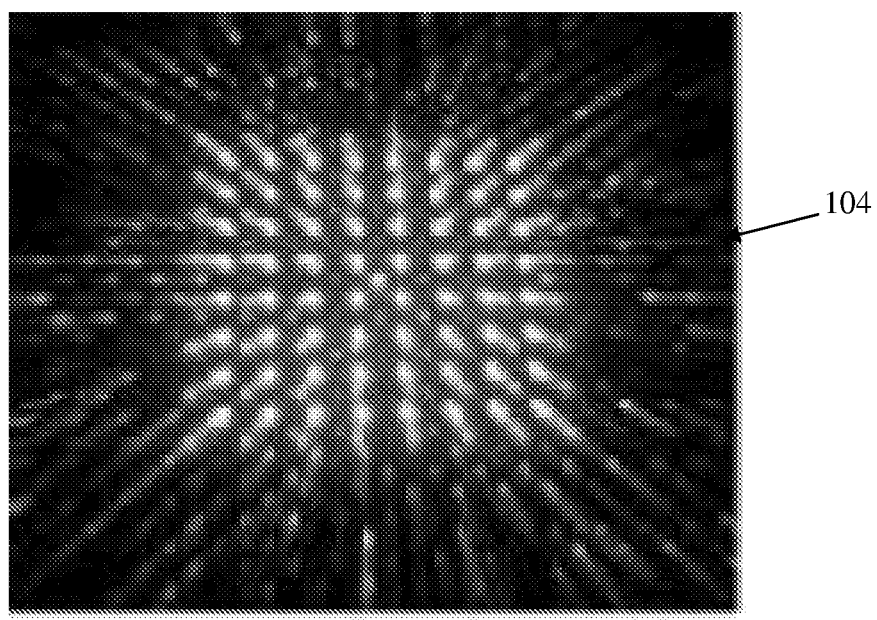
FIG. 10B is a photograph showing a broad white light laser transmitted through yet another nanopatterned biopolymer diffractive element in accordance with the present invention.

FIG. 10A shows silk optic diffractive grating 100, and FIG. 10B shows silk optic diffractive element 104. Both are example embodiments of the present invention and were manufactured in the manner described above. The devices were photographed when a broad white light laser was transmitted through the respective structures.

Figure 11A:
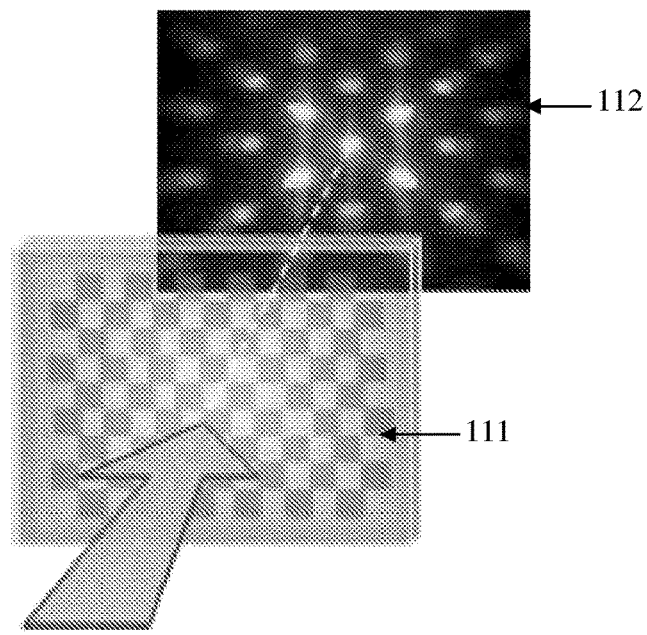
FIGS. 11A through 11C show far field images photographed after transmitting broadband white light laser through nanopatterned biopolymer optical devices in accordance with the present invention.
Figure 11B:
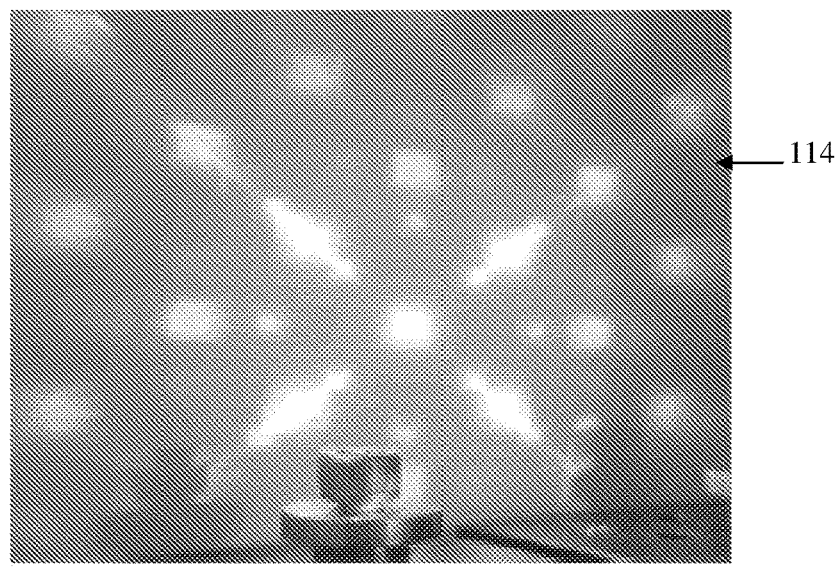
Figure 11C:
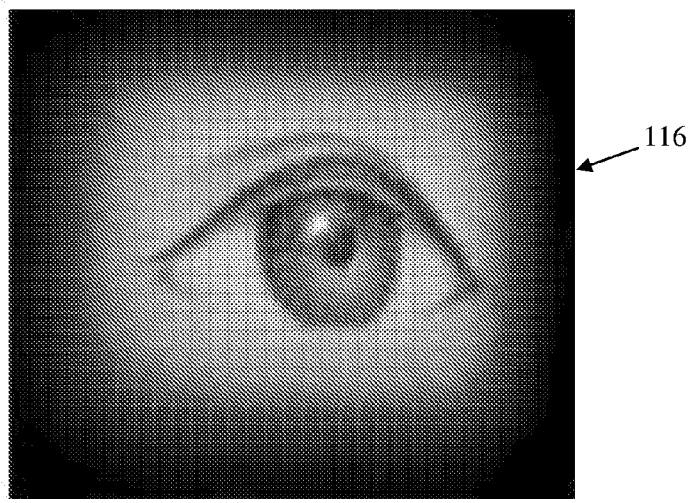

FIGS. 11A through 11C each show various far field images photographed after transmitting broadband white light laser through various silk diffractive optical devices. The resulting patterns are multicolored due to the dispersion of the broad supercontinuum laser used to generate the images. FIG. 11A is a schematic illustration of laser light passed through nanopatterned biopolymer optical device 111 to generate the light pattern shown in photograph 112. FIG. 11B is a photograph 114 of another pattern generated by laser light passed through another nanopatterned biopolymer optical device. FIG. 11C is a photograph 116 of still another pattern generated by a white laser light passed through still another nanopatterned biopolymer optical device. The nanopatterned biopolymer optical device of FIG. 11C is a replica of a diffractive pattern commercially available from Diffractive Optics, Inc. of Charlotte, N.C.

A significant advantage of nanopatterned biopolymer optical devices in accordance with the present invention is the ability to embed optics in entirely organic, biocompatible, and extremely functional substrates, thereby allowing the optics to be biologically active. In other words, the nanopatterned biopolymer optical devices of the present invention can be biologically activated by embedding organic materials, such as proteins, into the nanopatterned biopolymer optical device. For example, the silk diffraction grating described above can be fabricated so that changes can be biologically induced in the grating. This phenomenon alters the diffraction efficiency locally. The variation of the diffracted beams can then function as an indicator of the changes occurring at the biological level. Such responsive nanopatterned biopolymer optical devices can be implemented by the addition of nucleic acid, a dye, a cell, an antibody, as described further in Appendix I, enzymes, for example, peroxidase, lipase, amylose, organophosphate dehydrogenase, ligases, restriction endonucleases, ribonucleases, DNA polymerases, glucose oxidase, laccase, cells, viruses, bacterias, proteins, peptides for molecular recognition, small molecules, drugs, dyes, amino acids, vitamins, antixoxidants, plant cells, mammalian cells, and the like, DNA, RNA, RNAi, lipids, nucleotides, aptamers, carbohydrates, optically-active chromophores including beta carotene or porphyrins, light emitting organic compounds such as luciferin, carotenes and light emitting inorganic compounds, chemical dyes, antibiotics, yeast, antifungals, antivirals, and complexes such as hemoglobin, electron transport chain coenzymes and redox components, light harvesting compounds such as chlorophyll, phycobiliproteins, bacteriorhodopsin, protorhodopsin, and porphyrins and related electronically active compounds, or a combination thereof.

However, embedding such materials is preferable to coating because coatings can be more easily removed.

The diffracted orders of a diffraction grating are guided by equation:

$$\sin \alpha + \sin \beta = m\lambda/d$$

where $\alpha$ and $\beta$ are the angles of incidence and diffraction, respectively, of the incoming light, m is the diffraction order, and d is the pitch of the grating in lines/mm. Variations in d or absorbance as a function of $\lambda$, which are induced by changes at the biological level, will affect the resulting optical signature. This change in optical signature thus provides a convenient and integrated detection method. Surface functionalization can be tailored for macroscopic effects where the whole grating is affected, thereby making the spectral signature changes very dramatic (akin to optical limiters, for example).

Figure 12A:
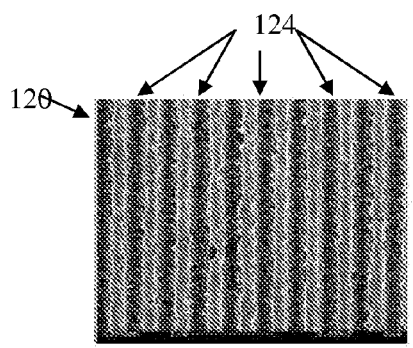
FIG. 12A shows a scanning electron microscope image of a surface of a nanopatterned biopolymer diffraction grating before surface processing.
Figure 12B:
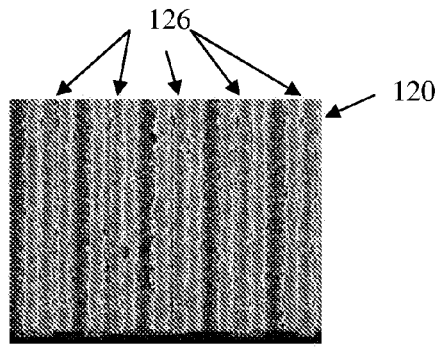
FIG. 12B shows a scanning electron microscope image of the surface of the nanopatterned biopolymer diffraction grating of FIG. 12A after surface processing.
Figure 12C:
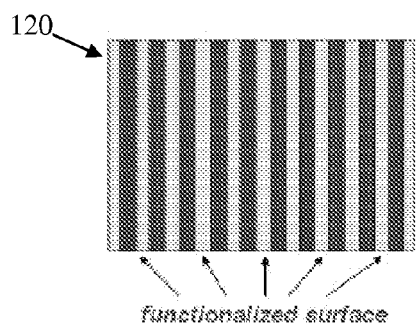
FIGS. 12C and 12D show schematic illustrations of the surface of the nanopatterned biopolymer diffraction grating shown in FIGS. 12A and 12B, respectively.
Figure 12D:
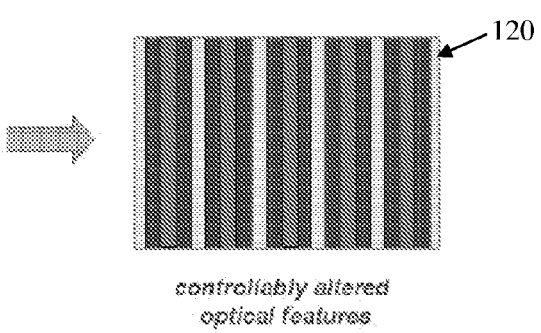

FIG. 12A shows a scanning electron microscope image of a surface of a silk diffraction grating 120 before surface processing. FIG. 12B shows a scanning electron microscope image of the surface of the silk diffraction grating 120 after surface processing. In particular, the surface of the silk diffraction grating 120 shown in FIGS. 12A and 12B are processed so that binding is obtained selectively on the troughs 124 of the diffraction grating 120, thereby altering the pitch and the resulting optical structure of the diffraction grating 120 as shown in FIG. 12B. FIG. 12A shows that every other trough has been filled with a binding 126. This filling of every other trough is also shown in the schematic illustration of FIGS. 12C and 12D that correspond to the scanning electron microscope images of FIGS. 12A and 12B. Reduction to practice of a functionalized surface of an optical silk grating was obtained by exposing a silk diffraction grating to different cell lines with varying affinity for the silk surface with which they come in contact. If affinity exists, the cells are deposited onto the surface, and they alter the diffraction pattern caused by the grating. In this manner, the presence of the cells can be readily detected.

Figure 13:
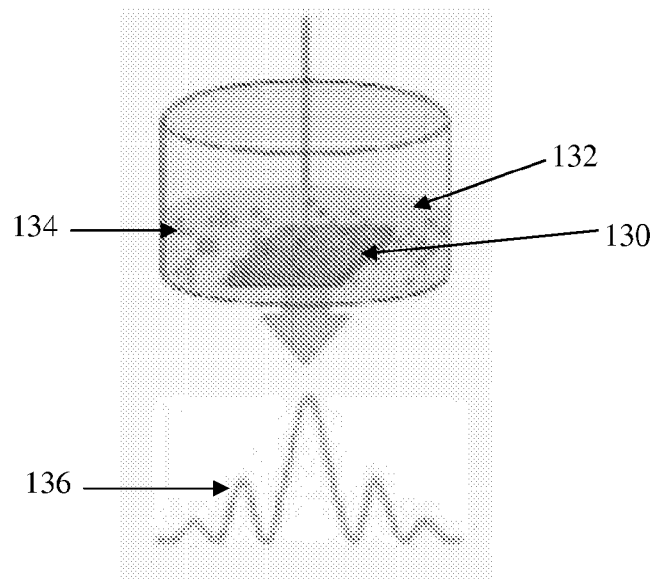
FIG. 13 shows a schematic illustration of immersion of a silk fibroin diffraction grating in corneal fibroblast, and photographs illustrating its impact on diffraction.

FIG. 13 schematically illustrates a silk diffraction grating 130 having 600 lines/mm exposed to a cellular environment of corneal fibroblast by immersing the silk diffraction grating 130 in a plain buffer solution 132 with corneal fibroblast 134. The silk fibroin is a good substrate for the fibroblast cells, which coats the surface of the silk diffraction grating 130 thereby removing (or interfering with) its diffractive properties. In contrast, the gratings that are exposed to an unsuitable environment for coating maintain their diffractive properties. The interference can be verified by monitoring the change in the transmission of light through the silk diffraction grating 130 as also schematically illustrated by the graph 136 of FIG. 13.

Figure 14A:
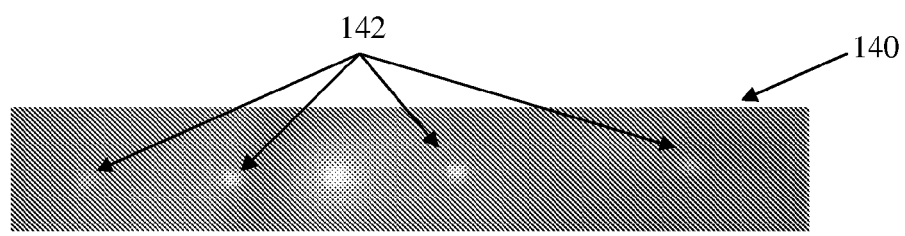
FIG. 14A shows the resultant efficient diffraction as a laser beam is propagated through a nanopatterned silk diffraction grating in a buffer solution.
Figure 14B:
FIG. 14B shows the comparative loss of diffraction properties with the silk diffraction grating in a corneal fibroblast solution.

FIG. 14A is a photograph 140 of the resultant efficient diffraction that occurs when a laser beam is propagated through a nanopatterned silk diffraction grating in a culture dish with the plain buffer solution. The resultant diffracted orders 142 are clearly shown in the photograph 140. In contrast, FIG. 14B is a photograph 144 of the resultant diffraction when the laser beam is propagated through the same nanopatterned silk diffraction grating in a culture dish with the corneal fibroblast solution. As clearly shown, the comparative loss of diffraction properties results when the nanopatterned silk diffraction grating is in the presence of the corneal fibroblast that deposits and alters the diffractive order. By examining the grating's diffractive properties, changes in the functionalized detection of the diffraction grating may be demonstrated.

Experimental realization of "active" biopolymer optical devices was investigated by altering the aqueous silk matrix solution with the inclusion of a variety of substances. The functionality of the substances was then verified within the optical matrix. The experiments involved embedding a physiologically relevant protein, an enzyme, and a small organic pH indicator within the silk matrix solution. All these samples were diluted into the aqueous silk fibroin solution, which was cast onto diffractive gratings to manufacture the nanopatterned biopolymer optical devices that integrate the diffractive properties of the optical element with the biological function of the dopant.

Figure 15A:
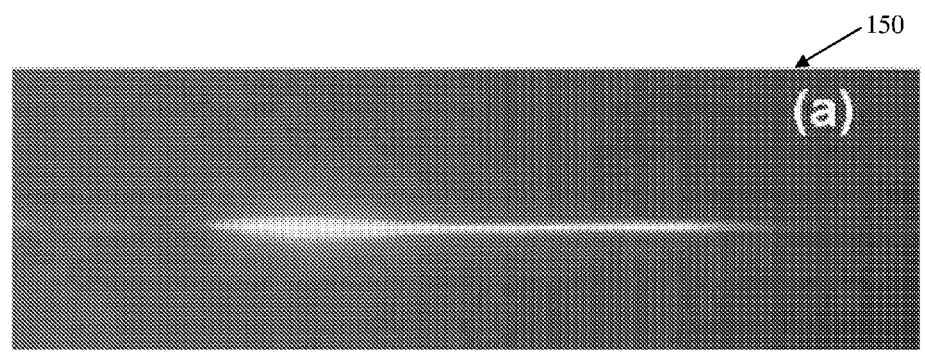
FIG. 15A is a photograph of a spectral image generated when supercontinuum light is transmitted through an undoped nanopatterned silk diffraction grating in accordance with the present invention.
Figure 15B:
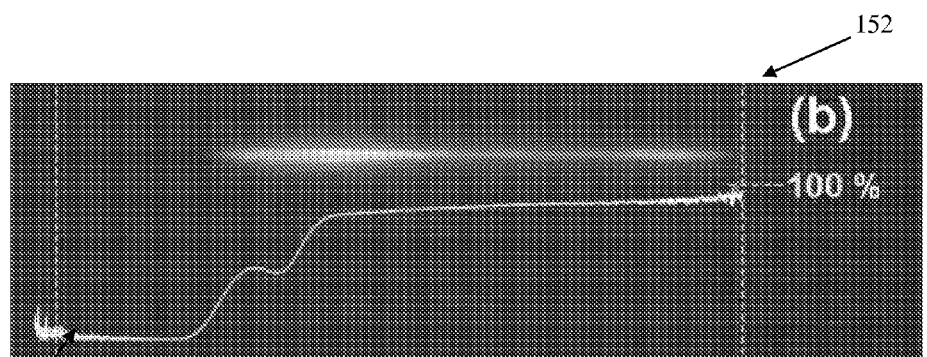
FIG. 15B is a photograph of a spectral image generated when supercontinuum light is transmitted through another nanopatterned silk diffraction grating embedded with phenolsulfonphthalein in accordance with the present invention.
Figure 15C:
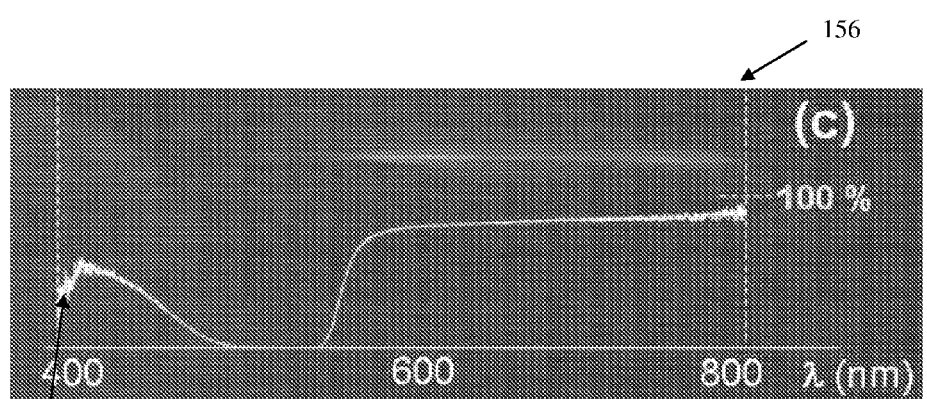
FIG. 15C is a photograph of a spectral image generated when supercontinuum light is transmitted through the nanopatterned silk diffraction grating of FIG. 15B when it is exposed to a base solution.

Results of one example experiment are shown in the spectral image photographs of FIGS. 15A through 15C in which supercontinuum light of 350 nm to more than 1,000 nm was transmitted through a nanopatterned silk diffraction grating in accordance with the present invention. The spectral images were taken at a distance of 15 cm from the nanopatterned silk diffraction grating. For reference purposes, photograph 150 of FIG. 15A illustrates the diffracted supercontinuum light when passed through an undoped nanopatterned silk diffraction grating and projected onto a fixed plane. Photograph 152 of FIG. 15B illustrates the diffracted supercontinuum light when passed through a nanopatterned silk diffraction grating that was activated by embedding it with phenolsulfonphthalein (PSP) and exposed to an acid solution. As can be seen, the spectral absorption of the silk diffraction grating is changed such that the diffracted supercontinuum spectrum is different than that shown in FIG. 15A. In FIG. 15B, the measured spectral transmission curve 154 is overlaid to match the diffracted supercontinuum spectrum detected. Photograph 156 of FIG. 15C illustrates the diffracted supercontinuum when the PSP-embedded nanopatterned silk diffraction grating is exposed to a base solution. The measured spectral transmission curve 158 is also overlaid to match the diffracted supercontinuum spectrum detected. As can be seen, more absorbance is exhibited towards the green end (that is, shorter wavelengths) of the spectrum.

To confirm biocompatibility of nanopatterned biopolymer optical devices, red blood cells (RBCs) were incorporated into a silk diffraction grating in accordance with the present invention that was manufactured as described above with regard to FIG. 1. The RBC-silk fibroin solution was prepared by combining 1 ml of an 80% hematocrit human RBC solution and 5 ml of the 8% silk solution. The mixture was cast on a 600 lines/mm optical grating and allowed to dry overnight. The film was removed from the optical grating and annealed for two hours. The grating structure was observed in the resultant RBC-doped silk diffraction grating.

Figure 16:
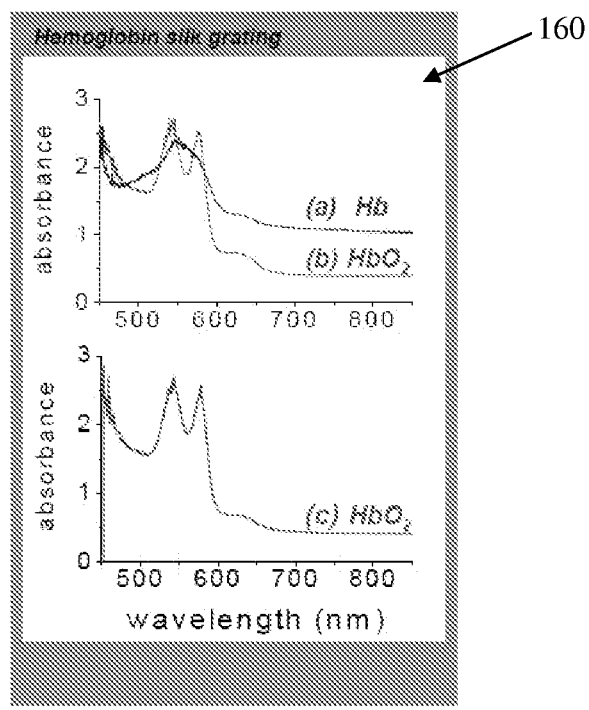
FIG. 16 is a results graph showing spectral absorbance of a red blood cell doped silk diffraction grating.

The RBC-doped silk diffraction grating was then tested to observe the diffraction orders. An optical transmission experiment was performed to determine whether hemoglobin (the oxygen-carrying protein contained in RBCs) maintained its activity within the matrix of the silk diffraction grating. The results graphs 160 are shown in FIG. 16 and indicate the retention of hemoglobin function within the RBC-doped silk diffraction grating. The X-axis corresponds to the wavelength (in nm), and the Y-axis indicates the absorbance by the RBC-doped silk diffraction grating.

In particular, the RBC-doped silk diffraction grating was inserted in a quartz cuvette filled with distilled water, and an absorbance curve was observed. This result is shown by line (b) $HbO_2$ in results graphs 160. As can be seen, the absorbance curve shown by line (b) $HbO_2$ exhibited two peaks typical of oxy-hemoglobin absorption. Subsequently, nitrogen gas was bubbled into the cuvette to deoxygenate the hemoglobin. After 15 minutes, the characteristic absorption peaks of oxy-hemoglobin disappeared from the absorbance curve. This result is shown by line (a) Hb in the results graphs 160. These results were further confirmed when the nitrogen flow to the cuvette is subsequently halted, which resulted in the reappearance of the oxy-hemoglobin peaks. This result is shown by line (c) $HbO_2$ in results graphs 160.

In another example experiment, horseradish peroxidase (HRP) enzyme was added to the silk fibroin matrix solution to generate a 0.5 mg/ml concentration of enzyme embedded in a silk diffraction grating that was manufactured as described with regard to FIG. 1. To verify enzyme activity, tetramethylbenzidine (TMB) was used to track functional enzyme activity in the silk diffraction gratings. TMB is an aromatic organic monomer that reacts with HRP and hydrogen peroxide to generate a color via a free radical reaction in the presence of active enzyme.

Figure 17:
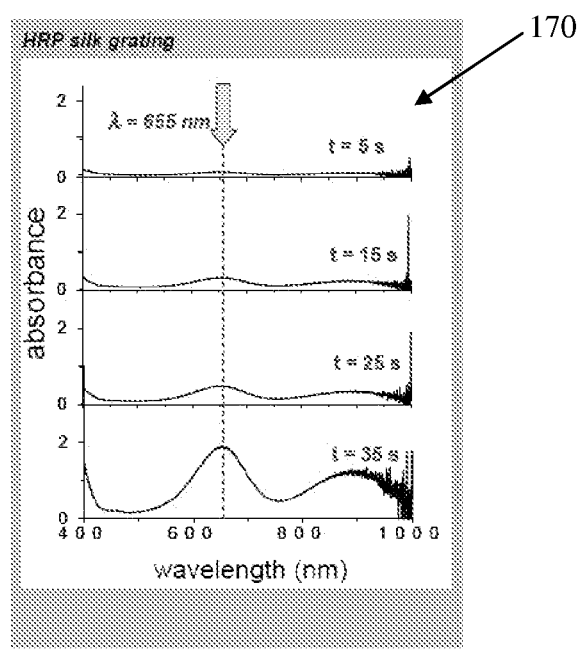
FIG. 17 is a results graph showing spectral absorbance of a horseradish peroxidase embedded silk diffraction grating.

The oxidation products of TMB yield a characteristic blue color (one-electron oxidation) yield a yellow color (two-electron oxidation). The recorded absorption spectra is shown in results graphs 170 of FIG. 17, where the X-axis corresponds to the wavelength (in nm), and the Y-axis indicates the absorbance by the HRP-embedded silk diffraction grating. The absorption spectra was recorded in graphs 90 at the initial stages of the reaction at 5, 15, 25, and 35 seconds, immediately after exposing the optical element to TMB. As can be seen in the results graphs 170, the absorbance progressively increased in the 600 nm to 700 nm wavelength range, with the peak absorbance observed at approximately 655 nm, thereby verifying enzyme activity. It should also be noted that these measurements shown in the results graphs 170 of FIG. 17 were taken 30 days after preparation of the HRP-embedded silk diffraction grating and after storing this diffraction grating at room temperature for this duration. This indicates that the HRP was active in the silk protein matrix during this time.

As another example, an organic pH indicator, phenolsulfonphthalein (phenol red), was mixed with the silk fibroin aqueous matrix solution, and cast onto 600 lines/mm gratings in the manner previously described with regard to FIG. 1. The resulting diffractive optical structures maintained the functionality of the pH indicator and the optical function of the silk diffraction grating. In particular, supercontinuum radiation was diffracted through the phenol-red embedded silk diffraction grating. The same diffraction grating was then dipped into solutions with different pH levels including 1 mM NaOH, 1 mM HCl, and DI $H_2O$. Changes in the dispersed spectrum were observed based on the acidity of the solutions into which the silk diffraction grating was dipped. Similar to the previously described nanopatterned biopolymer optical devices, the bioactive silk diffraction grating was observed to be mechanically robust and can be stored at room temperature, can be reused, and can be handled like a conventional optical element.

Figure 18:
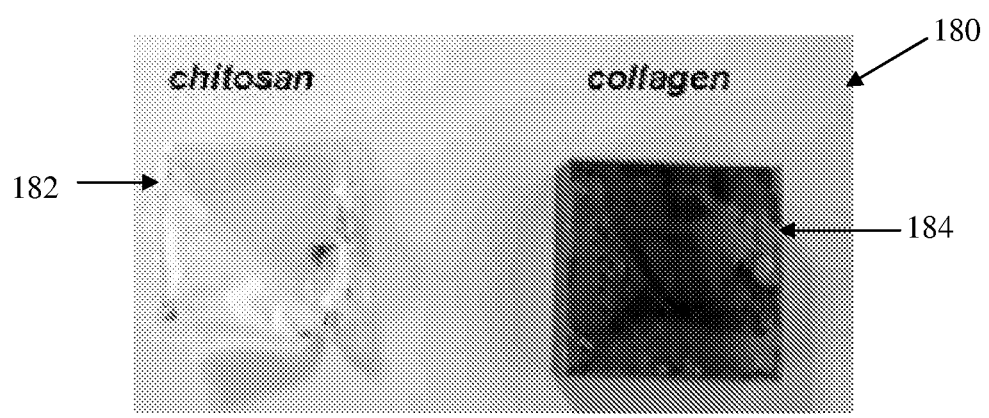
FIG. 18 illustrates diffractive biopolymer optical devices that have been cast with chitosan and collagen.

As previously noted, alternative biopolymers may also be used for fabrication of nanopatterned biopolymer optical devices in accordance with the present invention. FIG. 18 shows a photograph 180 that illustrates other diffractive biopolymer optical devices that have been cast using different materials. In particular, a chitosan optical device 182 and a collagen optical device 184 have also been manufactured in accordance with the present invention. With respect to chitosan, optical diffraction characteristics similar to silk have been observed.

It should be evident from the above discussion and the example nanopatterned biopolymer optical devices shown and discussed that the present invention provides biodegradable nanopatterned biopolymer optical devices. High quality nanopatterned biopolymer optical devices were manufactured that are naturally biocompatible, can be processed in water, and can undergo degradation with controlled lifetimes. As explained above, the nanopatterned biopolymer optical devices of the present invention may also be biologically activated by incorporating small organic materials. For example, the small organic materials may be complex proteins such as hemoglobin in the red blood cells and enzymes such as peroxidase. The present invention broadens the versatility of optical devices by allowing the direct incorporation of labile biological receptors in the form of peptides, enzymes, cells, antibodies, or related systems, and allows such optical devices to function as biological sensing devices.

The nanopatterned biopolymer optical devices of the present invention can be readily used in environmental and life sciences where biocompatibility and biodegradability are paramount. For example, the nanopatterned biopolymer optical devices as described above can be unobtrusively used to monitor a natural environment such as in the human body and may be implanted in vivo without a need to retrieve the device at a later time. The degradation lifetime of the nanopatterned biopolymer optical devices of the present invention can be controlled during the manufacturing process, for example, by controlling the ratio and amount of the solution matrix cast. Moreover, the nanopatterned biopolymer optical devices of the present invention can be dispersed in the environment, again without the need to retrieve them at a later time, thereby providing novel and useful devices for sensing and detection.

The foregoing description of the aspects and embodiments of the present invention provides illustration and description, but is not intended to be exhaustive or to limit the invention to the precise form disclosed. Those of skill in the art will recognize certain modifications, permutations, additions, and combinations of those embodiments are possible in light of the above teachings or may be acquired from practice of the invention. Therefore the present invention also covers various modifications and equivalent arrangements that fall within the purview of the appended claims.

Antibody Stability in Silk Films

Materials—
Anti-IL-8 monoclonal antibody (IgG1) was purchased from eBioscience, Inc. human polyclonal antibody IgG and human IgG ELISA Quantitation Kit were purchased from Bethyl Laboratories Inc. All other chemicals used in the study were purchased from Sigma-Aldrich (St. Louis, Mo.).

Figure 19:
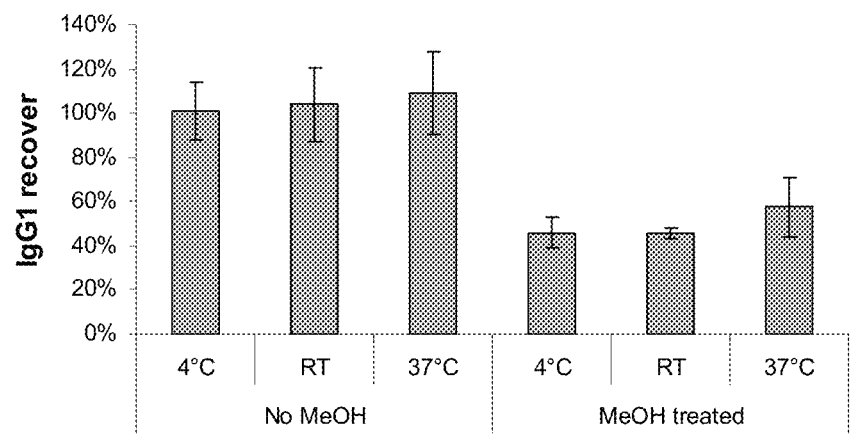
FIG. 19 is a graph showing antibody IgG1 activity related to initial activity in the silk films prepared in the two different formats and stored at the three different temperatures.

Antibody Entrapment in Silk Films— human polyclonal antibody IgG Ten ml 1 mg/ml IgG mixed with 167 ml 6% silk solution make the IgG concentration in silk film mg/g silk. 100 µl of mixed IgG solution was added to each well of 96 well plate which was placed in a fume hood with cover opened overnight. The dried film was either treated or not treated with methanol. For methanol treatment, the wells were immersed in 90% methanol solution for 5 min and dried in the fume hood. All dry 96 well plates were then stored at 4° C., room temperature, and 37° C. (FIG. 19).

Anti-IL-8 Monoclonal Antibody (IgG1)—

Figure 20:
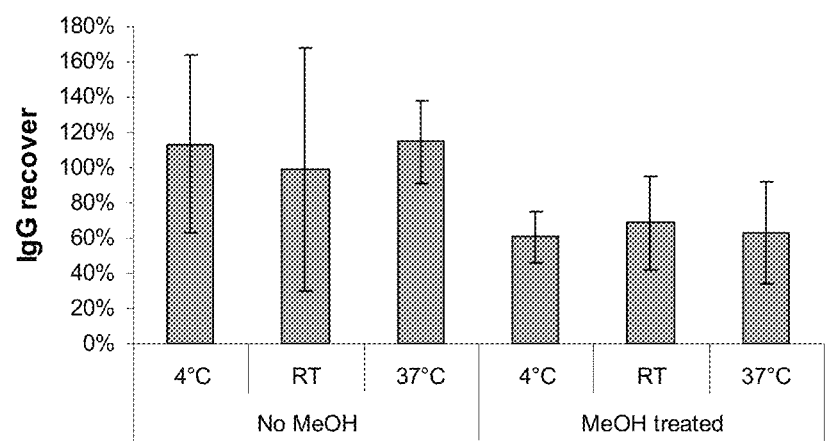
FIG. 20 is a graph showing antibody IgG activity related to initial activity in the silk films prepared in the two different formats and stored at the three different temperatures.

0.5 ml 1 mg/ml IgG1 mixed with 83 ml 6% silk solution make the IgG1 concentration in silk film 0.1 mg/g silk. 50 µl of mixed IgG1 solution was added to a well of 96 well plate which was placed in a fume hood with cover opened overnight. The dried film was either treated or not treated with methanol. For methanol treatment, the wells were immersed in 90% methanol solution for 5 min and dried in the fume hood. All dry 96 well plates were then stored at 4° C., room temperature, and 37° C. (FIG. 20).

Antibody Measurement—

Five wells prepared at the same condition were measured for statistic. Pure silk (without antibody) was used as a control.

For non methanol-treated samples, 100 µl of PBS buffer, pH 7.4, was added to the well which was further incubated at room temperature for 30 min to allow the film to completely dissolve. Aliquot of solution was then subjected to antibody measurement. For methanol-treated samples, 100 µl HFIP was added into each well which was further incubated at room temperature for 2 hours to allow the film completely dissolve. The silk HFIP solution was dried in a fume hood overnight. The follow step was the same as non methanol-treated samples, added PBS buffer and pipette the solution for antibody measurement.

ELISA—

Polystyrene (96-well) microtitre plate was coated with 100 µL of antigen anti-Human IgG-affinity at a concentration of 10 µg/mL prepared in antigen coating buffer (bicarbonate buffer, 50 mM, pH 9.6) and then incubated overnight storage at room temperature. The wells were then washed three times with TBS-T buffer. The unoccupied sites were blocked with 1% BSA in TBS (200 µL each well) followed by incubation for 30 minutes at room temperature. The wells were then washed three times with TBS-T. The test and control wells were then diluted with 100 µL of serially diluted serum. Each dilution was in TBS buffer. Serially diluted blanks corresponding to each dilution were also present. The plate was then incubated for 1 h at room temperature. The plate was washed again with TBS-T buffer (five times). Bound antibodies were assayed with an appropriate conjugate of anti-human IgG-HRP (1:100,000), 100 µL of it was coated in each well and kept at room temperature for 1 hour. Washing of the plate with TBS-T (five times) was followed by addition of 100 µL TMB in each well and incubation at room temperature for 5-20 min. The absorbance of each well was monitored at 450 nm on a VersaMax microplate reader (Molecular devices, Sunnyvale, Calif.).

What is claimed is:

1. An optically active biological device, comprising:
 a silk fibroin film, wherein the film is characterized by beta-sheet secondary structure, such that when the film is free-standing from a substrate, it is structurally stable, the silk fibroin film comprising:
  at least one biologically active dopant, wherein the dopant retains its biological activity after it is embedded in the silk fibroin film and/or coated on a surface of the film;
  shaped features that correspond to a diffractive or refractive structure,
   wherein the shaped features are or comprise optical gratings, micro lens arrays, nano lens arrays, pattern generators, beam diffusers, beam homogenizers, photonic crystals, or photonic waveguides, and
   wherein the shaped features are characterized by a localized surface roughness of less than about 20 nm RMS when those features have a regular nanoscale pattern no smaller than about 210 nm, and
  wherein the device is characterized in that when it is exposed to incident electromagnetic radiation it exhibits a response that corresponds to the shaped features of the silk fibroin film, the at least one biologically active dopant, or a combination thereof.

2. The optically active biological device of claim 1, wherein the at least one biologically active dopant is an organic material.

3. The optically active biological device of claim 1, wherein the at least one biologically active dopant is selected from the group consisting of nucleic acid, a dye, a cell, an antibody, enzymes, peroxidase, lipase, amylose, organophosphate dehydrogenase, ligases, restriction endonucleases, ribonucleases, DNA polymerases, glucose oxidase, laccase, cells, viruses, bacterias, proteins, peptides for molecular recognition, small molecules, drugs, dyes, amino acids, vitamins, antioxidants, plant cells, mammalian cells, DNA, RNA, RNAi, lipids, nucleotides, aptamers, carbohydrates, optically active chromophores, beta carotene, porphyrins, light emitting organic compounds, luciferin, carotenes, light emitting inorganic compounds, chemical dyes, antibiotics, yeast, antifungals, antivirals, complexes, hemoglobin, electron transport chain coenzymes, redox components, light harvesting compounds, chlorophyll, phycobiliproteins, bacteriorhodopsin, protorhodopsin, porphyrins, electronically active compounds, or combinations thereof.

4. The optically active biological device of claim 1, wherein the optical grating is a holographic diffraction grating.

5. The optically active biological device of claim 1, wherein the silk fibroin film is transparent.

6. The optically active biological device of claim 1, wherein the silk fibroin film transmits light across the visible region.

7. The optically active biological device of claim 1, wherein the shaped features are between about 100 nm and a few microns.

8. The optically active biological device of claim 4, wherein the shaped features have a peak to valley height difference down to about 60 nm and a period down to about 125 nm.

9. The optically active biological device of claim 1, wherein the silk fibroin film is formed from a silk fibroin solution having a concentration between about 1 wt % about 30 wt % silk.

10. The optically active biological device of claim 1, wherein the silk fibroin film is formed from silkworm silk.

11. The optically active biological device of claim 1, wherein the silk fibroin film are characterized in that the features retain their shape when the incident electromagnetic radiation is about 1 W.

12. A method of manufacturing the optically active biological device of claim 1, comprising:
providing a substrate having features patterned on its surface, wherein the surface of the substrate provides a template;
providing a silk fibroin solution;
embedding at least one biologically active dopant in the silk fibroin solution;
depositing the silk fibroin solution on the surface of the substrate;
drying the silk fibroin solution to form the silk fibroin film; and
removing the silk fibroin film from the substrate.

13. The method of claim 12, further comprising a step of annealing the silk fibroin film.

14. The method of claim 13, wherein the annealing step is performed in at least one of a vacuum environment or a water vapor environment.

15. The method of claim 12, wherein the template is for an optic selected from the group consisting of optical gratings, micro lens arrays, nano lens arrays, pattern generators, beam diffusers, beam homogenizers, photonic crystals, and photonic waveguides.

16. The method of claim 12, wherein the silk fibroin solution is an aqueous silk fibroin solution having approximately 1.0 wt % to 30 wt % silk, inclusive.

17. The method of claim 16, wherein the aqueous silk fibroin solution has approximately 8.0 wt % silk.

18. The method of claim 12, comprising a step of coating the silk fibroin film with the at least one biologically active dopant.

19. The method of claim 12, wherein the at least one biologically active dopant is selected from the group consisting of nucleic acid, a dye, a cell, an antibody, enzymes, peroxidase, lipase, amylose, organophosphate dehydrogenase, ligases, restriction endonucleases, ribonucleases, DNA polymerases, glucose oxidase, laccase, cells, viruses, bacterias, proteins, peptides for molecular recognition, small molecules, drugs, dyes, amino acids, vitamins, antioxidants, plant cells, mammalian cells, DNA, RNA, RNAi, lipids, nucleotides, aptamers, carbohydrates, optically active chromophores, beta carotene, porphyrins, light emitting organic compounds, luciferin, carotenes, light emitting inorganic compounds, chemical dyes, antibiotics, yeast, antifungals, antivirals, complexes, hemoglobin, electron transport chain coenzymes, redox components, light harvesting compounds, chlorophyll, phycobiliproteins, bacteriorhodopsin, protorhodopsin, porphyrins, electronically active compounds, or combinations thereof.

20. The method of claim 12, wherein the providing step comprises machining the nanopatterned structure on the surface of the substrate.

21. The method of claim 20, wherein the step of machining is performed using a laser.

22. The method of claim 21, wherein the step of laser machining is performed by femtosecond laser pulses generated by the laser.

23. The method of claim 12, prior to the step of depositing, further comprising a step of coating the surface of the substrate so that when removed, the silk fibroin film evenly detaches from the substrate.

* * * * *